(12) United States Patent
Vitas et al.

(10) Patent No.: US 12,467,730 B2
(45) Date of Patent: *Nov. 11, 2025

(54) TAPE MEASURE WITH TAPE BLADE PROFILE INCREASING TAPE STANDOUT

(71) Applicant: Milwaukee Electric Tool Corporation, Brookfield, WI (US)

(72) Inventors: Jonathan F. Vitas, Muskego, WI (US); Abhijeet A. Khangar, Pewaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/742,391

(22) Filed: Jun. 13, 2024

(65) Prior Publication Data

US 2024/0328768 A1 Oct. 3, 2024

Related U.S. Application Data

(63) Continuation of application No. 18/302,445, filed on Apr. 18, 2023, now Pat. No. 12,038,272, which is a continuation of application No. 17/328,388, filed on May 24, 2021, now Pat. No. 11,656,067, which is a continuation of application No. 16/927,693, filed on Jul. 13, 2020, now Pat. No. 11,022,416, which is a
(Continued)

(51) Int. Cl.
| | |
|---|---|
| *G01B 3/1003* | (2020.01) |
| *G01B 1/00* | (2006.01) |
| *G01B 3/1005* | (2020.01) |
| *G01B 3/1041* | (2020.01) |

(52) U.S. Cl.
CPC ............. *G01B 3/1003* (2020.01); *G01B 1/00* (2013.01); *G01B 3/1041* (2013.01); *G01B 2003/103* (2013.01); *G01B 2003/1038* (2013.01)

(58) Field of Classification Search
CPC ...... G01B 3/1003; G01B 1/00; G01B 3/1041; G01B 2003/103; G01B 2003/1038; G01B 3/1005; G01B 2003/1023
See application file for complete search history.

(56) References Cited

U.S. PATENT DOCUMENTS

| | | |
|---|---|---|
| 4,429,462 A | 2/1984 | Rutty et al. |
| 6,324,769 B1 | 12/2001 | Murray |

(Continued)

FOREIGN PATENT DOCUMENTS

| | | |
|---|---|---|
| CN | 1752711 | 3/2006 |
| CN | 1922462 A | 2/2007 |

(Continued)

OTHER PUBLICATIONS

Petition for Post Grant Review of U.S. Pat. No. 10,422,617, dated Apr. 10, 2020, 103 pages.

(Continued)

*Primary Examiner* — Yaritza Guadalupe-McCall
(74) *Attorney, Agent, or Firm* — Reinhart Boerner Van Deuren s.c.

(57) ABSTRACT

A tape measure, including a tape measure blade having a cross-sectional profile to increase standout is provided. The profile has a curved shape that increases standout. The tape blade may have a flat width greater than 33 mm.

20 Claims, 16 Drawing Sheets

Related U.S. Application Data continuation of application No. 16/113,695, filed on Aug. 27, 2018, now Pat. No. 10,712,142, which is a continuation of application No. PCT/US2018/047759, filed on Aug. 23, 2018.

(60) Provisional application No. 62/702,575, filed on Jul. 24, 2018, provisional application No. 62/549,511, filed on Aug. 24, 2017.

(56) References Cited

U.S. PATENT DOCUMENTS

| | | | |
|---|---|---|---|
| 7,159,331 B2 | 1/2007 | Critelli et al. | |
| 10,126,107 B2 | 11/2018 | Khangar et al. | |
| 10,422,617 B1* | 9/2019 | Vitas | G01B 3/1041 |
| 10,697,747 B1* | 6/2020 | Vitas | G01B 3/1003 |
| 10,712,142 B2* | 7/2020 | Vitas | G01B 3/1003 |
| 10,989,512 B2 | 4/2021 | McKenzie et al. | |
| 10,989,513 B2 | 4/2021 | McKenzie et al. | |
| 11,022,416 B2* | 6/2021 | Vitas | G01B 3/1003 |
| 11,293,739 B2* | 4/2022 | Vitas | G01B 3/1003 |
| 11,480,418 B2 | 10/2022 | McKenzie et al. | |
| 11,499,809 B2* | 11/2022 | Herritz | G01B 3/1005 |
| 11,656,067 B2* | 5/2023 | Vitas | G01B 3/1003 33/771 |
| 12,038,272 B2* | 7/2024 | Vitas | G01B 3/1041 |
| 12,044,526 B2* | 7/2024 | Khangar | G01B 3/1003 |
| 2002/0129509 A1 | 9/2002 | Evans, III | |
| 2007/0079520 A1 | 4/2007 | Levine et al. | |
| 2008/0010847 A1 | 1/2008 | Liao | |
| 2015/0247716 A1 | 9/2015 | Craig et al. | |
| 2019/0063893 A1 | 2/2019 | Vitas et al. | |
| 2019/0242686 A1* | 8/2019 | Reddy | G01B 3/1005 |
| 2019/0316892 A1 | 10/2019 | Vitas et al. | |
| 2020/0340792 A1 | 10/2020 | Vitas et al. | |
| 2021/0278188 A1 | 9/2021 | Vitas et al. | |
| 2022/0042779 A1 | 2/2022 | Khangar et al. | |
| 2022/0065605 A1 | 3/2022 | Vitas et al. | |
| 2022/0146244 A1 | 5/2022 | Khangar et al. | |
| 2022/0252383 A1 | 8/2022 | Khangar et al. | |
| 2022/0363510 A1 | 11/2022 | Vitas et al. | |
| 2023/0251073 A1* | 8/2023 | Vitas | G01B 3/1003 33/771 |
| 2024/0418491 A1* | 12/2024 | Khangar | G01B 1/00 |
| 2025/0076018 A1* | 3/2025 | Herritz | G01B 3/1046 |
| 2025/0085094 A1* | 3/2025 | Khangar | G01B 3/1003 |

FOREIGN PATENT DOCUMENTS

| | | |
|---|---|---|
| CN | 106091856 | 11/2016 |
| CN | 106537080 A | 3/2017 |
| JP | 2001201301 | 7/2001 |
| TW | 201333424 | 8/2013 |

OTHER PUBLICATIONS

Patent Owner's Preliminary Response to Petition for Post Grant Review of U.S. Pat. No. 10,422,617, dated Jul. 15, 2020, 60 pages.
Exhibit 2001, "Expert Declaration of Dr. Kimberly Cameron" in PGR 2020-00056, 34 pages.
Exhibit 2002, "Declaration of Inventor A. Khangar" in PGR 2020-00056, 16 pages.
Exhibit 2003, "Milwaukee Wide Blade Tape Measure" in PGR 2020-00056, 4 pages.
Exhibit 2004, "CDCA-03-03-cv-00655-60" in PGR 2020-00056, 8 pages.
Exhibit 2005, "DMN-0-13-cv-01287-155" in PGR 2020-00056, 44 pages.
Exhibit 2006, "Dictionary Definition of Profile" in PGR 2020-00056, 3 pages.
Exhibit 2007, "Dictionary Definition of Such That" in PGR 2020-00056, 3 pages.
Exhibit 2008, "Patent Office Assignment Record for Gilliam Ex. 1013" in PGR 2020-00056, 2 pages.
Exhibit 2009, "Milwaukee Tool Internal Stand Out Issue Analysis May 8, 2017" in PGR 2020-00056, 3 pages.
Exhibit 2010, "Dr. Kimberly Cameron CV" in PGR 2020-00056, 5 pages.
Exhibit 2011, "Dr. Kimberly Cameron Testifying Experience" in PGR 2020-00056, 2 pages.
Exhibit 2012, "Dictionary Definition of Define" in PGR 2020-00056, 3 pages.

* cited by examiner

TAPE MEASURE WITH TAPE BLADE PROFILE INCREASING TAPE STANDOUT

CROSS-REFERENCE TO RELATED PATENT APPLICATIONS

The present application is a continuation of U.S. application Ser. No. 18/302,445, filed Apr. 18, 2023, which is a continuation of U.S. application Ser. No. 17/328,388, filed May 24, 2021, now U.S. Pat. No. 11,656,067, which is a continuation of U.S. application Ser. No. 16/927,693, filed Jul. 13, 2020, now U.S. Pat. No. 11,022,416, which is a continuation U.S. application Ser. No. 16/113,695, filed Aug. 27, 2018, now U.S. Pat. No. 10,712,142, which is a continuation of International Application No. PCT/US2018/047759, filed Aug. 23, 2018, which claims the benefit of and priority to U.S. Provisional Application No. 62/702,575, filed on Jul. 24, 2018, and U.S. Provisional Application No. 62/549,511, filed on Aug. 24, 2017, all of which are incorporated herein by reference in their entireties.

BACKGROUND OF THE INVENTION

The present invention relates generally to the field of tools. The present invention relates specifically to a tape measure, measuring tape, retractable rule, etc., that includes a tape measure blade with a profile shape that increases tape standout.

Tape measures are measurement tools used for a variety of measurement applications, including in the building and construction trades. Some tape measures include a graduated, marked blade wound on a reel and also include a retraction system for automatically retracting the blade onto the reel. In some such tape measure designs, the retraction system is driven by a coil or spiral spring that is tensioned, storing energy as the tape is extended, and that releases energy to spin the reel, winding the blade back onto the reel such that automatic or non-manual tape retraction is provided. In some other tape measure designs, retraction of the tape is controlled via a manual crank, and such tape measure blades tend to have a long length.

SUMMARY OF THE INVENTION

One embodiment of the invention relates to a tape measure including a tape blade having a profiled cross-sectional shape to increase standout. In a specific embodiment, the tape blade has a flat width less than 27.94 mm and has standout of greater than 115 inches, specifically greater than 120 inches, more specifically greater 125 inches and more specifically greater than 130 inches. In a specific embodiment, the tape blade has a flat width less than 27.94 mm and a curved height greater than 6.3 mm. In a specific embodiment, the tape blade has a flat width less than 27.94 mm and a curved width less than 22.5 mm. In some such embodiments, the tape blade has an angle A (defined below) less than 90 degrees.

Another embodiment relates to a tape measure including a tape blade having a profiled cross-sectional shape to increase standout along with a low tape blade steel thickness. In a specific embodiment, the tape blade has a metal thickness of less than 0.13 mm, specifically between 0.09 mm and 0.13 mm, and has standout of greater than 115 inches, specifically greater than 120 inches, more specifically greater 125 inches and more specifically greater than 130 inches. In a specific embodiment, the tape blade has a metal thickness of less than 0.13 mm, specifically between 0.09 mm and 0.13 mm, and a curved height greater than 6.3 mm. In a specific embodiment, the tape blade has a metal thickness of less than 0.13 mm, specifically between 0.09 mm and 0.13 mm, and a curved width less than 22.5 mm. In some such embodiments, the tape blade has an angle A (defined below) less than 90 degrees.

Another embodiment of the invention relates to a tape measure. The tape measure includes a housing, a reel rotatably mounted within the housing and an elongate blade wound around the reel. The elongate blade includes an elongate metal core having an upper surface, a lower surface and a first thickness, T1, measured between the upper surface and the lower surface. The elongate blade includes an upper polymer coating coupled to the upper surface of the elongate metal core, the upper polymer coating having a second thickness, T2, and an upper surface defining the uppermost surface of the elongate blade. The elongate blade includes a lower polymer coating coupled to the lower surface of the elongate metal core, the lower polymer coating having a third thickness, T3, and a lower surface defining the lowermost surface of the elongate blade. The elongate blade includes a curved profile such that the uppermost surface of the elongate blade defines a concave surface, the lowermost surface defines a convex surface, a curved width and a curved height. A flat width of the elongate metal core is less than 32 mm. A ratio of the curved width to a flat width of the elongate metal core is less than 0.74. A ratio of the curved height to the flat width of the elongate metal core is greater than 0.29. A standout distance of the elongate blade from the housing is greater than 150 inches. The tape measure includes a retraction system coupled to the tape reel, and the retraction system drives rewinding of the elongate tape blade on to the tape reel.

Another embodiment of the invention relates to a tape measure. The tape measure includes a housing, a reel rotatably mounted within the housing and an elongate blade wound around the reel. The elongate blade includes an elongate metal core having an upper surface, a lower surface and a first thickness, T1, measured between the upper surface and the lower surface. The elongate blade includes an upper polymer coating coupled to the upper surface of the elongate metal core, the upper polymer coating having a second thickness, T2, and an upper surface defining the uppermost surface of the elongate blade. The elongate blade includes a lower polymer coating coupled to the lower surface of the elongate metal core, the lower polymer coating having a third thickness, T3, and a lower surface defining the lowermost surface of the elongate blade. The elongate blade includes a curved profile such that the uppermost surface of the elongate blade defines a concave surface, the lowermost surface defines a convex surface, a curved width and a curved height. A flat width of the elongate metal core is 32 mm or greater. A ratio of the curved width to a flat width of the elongate metal core is less than 0.70. A ratio of the curved height to the flat width of the elongate metal core is greater than 0.31. A standout distance of the elongate blade from the housing is greater than 150 inches. The tape measure includes a retraction system coupled to the tape reel, and the retraction system drives rewinding of the elongate tape blade on to the tape reel.

Another embodiment of the invention relates to a tape measure. The tape measure includes a housing, a reel rotatably mounted within the housing and an elongate blade wound around the reel. The elongate blade includes an upper surface, a lower surface, a curved profile such that the upper surface of the elongate blade defines a concave surface and the lower surface defines a convex surface. The elongate blade includes a flat width of 30 mm or less, a curved width, wherein the curved width is less than the flat width and a standout distance of the elongate blade from the housing of at least 132 inches. The tape measure includes a retraction system coupled to the tape reel, and the retraction system drives rewinding of the elongate tape blade on to the tape reel.

Another embodiment of the invention relates to a tape measure. The tape measure includes a housing, a reel rotatably mounted within the housing and an elongate blade wound around the reel. The elongate blade includes an upper surface, a lower surface and a curved profile such that the upper surface of the elongate blade defines a concave surface and the lower surface defines a convex surface. The elongate blade includes a flat width greater than or equal to 29 mm and less than 32 mm, a curved width, wherein the curved width is less than the flat width and a standout distance of the elongate blade from the housing of at least 156 inches. The tape measure includes a retraction system coupled to the tape reel, and the retraction system drives rewinding of the elongate tape blade on to the tape reel.

Another embodiment of the invention relates to a tape measure. The tape measure includes a housing, a reel rotatably mounted within the housing and an elongate blade wound around the reel. The elongate blade includes an upper surface, a lower surface and a curved profile such that the upper surface of the elongate blade defines a concave surface and the lower surface defines a convex surface. The elongate blade includes a flat width greater than 32 mm, a curved width, wherein the curved width is less than the flat width and a standout distance of the elongate blade from the housing of at least 168 inches. The tape measure includes a retraction system coupled to the tape reel, wherein the retraction system drives rewinding of the elongate tape blade on to the tape reel.

Additional features and advantages will be set forth in the detailed description which follows, and, in part, will be readily apparent to those skilled in the art from the description or recognized by practicing the embodiments as described in the written description and claims hereof, as well as the appended drawings. It is to be understood that both the foregoing general description and the following detailed description are exemplary.

The accompanying drawings are included to provide further understanding and are incorporated in and constitute a part of this specification. The drawings illustrate one or more embodiments and, together with the description, serve to explain principles and operation of the various embodiments.

DETAILED DESCRIPTION

Figure 1:
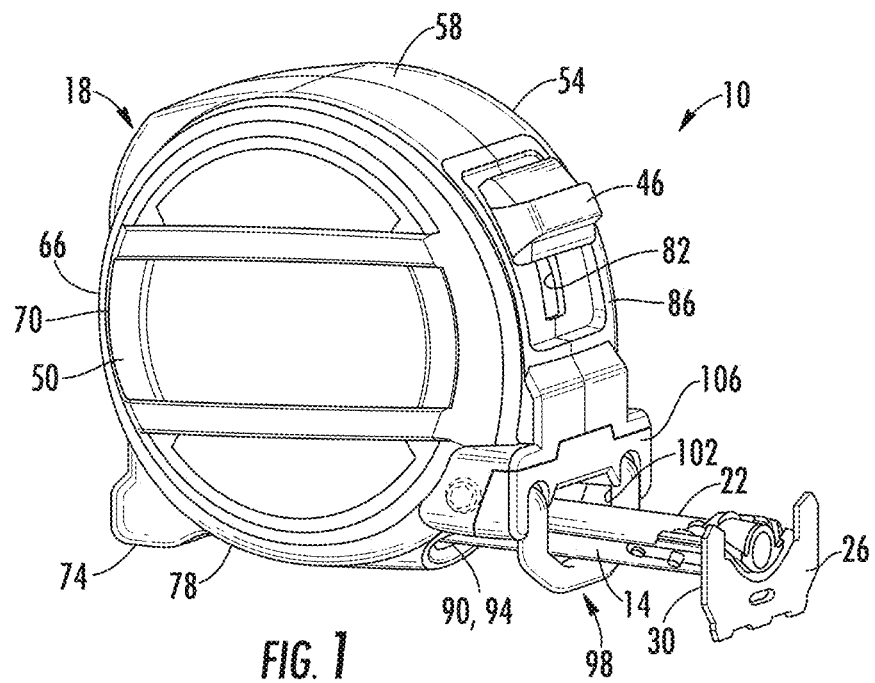
FIG. 1 is a left side perspective view of a tape measure, according to an exemplary embodiment.

Referring generally to the figures, various embodiments of a tape measure are shown. Various embodiments of the tape measure discussed herein include an innovative tape blade profile that Applicant believes greatly improves tape standout. In general, Applicant has determined that by shaping the tape blade to a relatively aggressive or steep curved profile shape (as discussed and quantified below), tape standout can be increased and tape droop can be decreased greatly even when utilizing relatively thin and/or relatively narrow pieces of steel for the tape blade. In some embodiments, the steep curved profile shape is formed only along a relatively short lengthwise section of the tape blade that is positioned within a lengthwise zone in which a standard tape tends to buckle during standout. Without being bound by a particular theory, Applicant understands that the steep curved profile shape increases rigidity and buckle resistance, and in particular, tape standout is greatly increased by locating this curved profile shape within the zone where buckling tends to occur.

Further, Applicant has found that some steep or tight curved shapes may impact readability of markings and numbers on the tape blade due to the relatively steep vertical positioning of the outer widthwise segments of the tape blade. Accordingly, in some embodiments, the tape blade profiles discussed herein may include outer widthwise segments of the tape blade that are somewhat flattened toward horizontal to provide improved readability of markings positioned thereon. In such embodiments, the central widthwise portion of the tape blade includes a highly curved, rigidity increasing profile shape, while outer widthwise segments of the tape blade are slightly flattened back toward horizontal to improve readability of numbers positioned thereon. As discussed below, this readability improving shape is defined by angle A, shown in FIG. 5.

Surprisingly, Applicant has further determined that standout can be increased by utilizing a compound curved shape, without increasing retraction torque requirements. In such embodiments, the center region of the tape blade profile has a more curved (e.g., smaller radius of curvature) shape than the edge regions. Applicant has found that such a shape may increase standout and improve readability of markings on the tape measure without increasing retraction torque requirement. In contrast to Applicant's understanding of conventional wisdom in the tape measure, the tape blade profiles discussed herein provide a combination of increased standout, lower retraction torque and/or increased readability, while maintaining a relatively low thickness tape blade.

In some embodiments, the tape blade profile may has a continuous curved shape, such as a parabolic or catenary curved shape. In such embodiments, Applicant has found that continuous curved tape blades may improve durability or tear resistance. For example, Applicant has determined, that at least for some designs, when a tape blade buckles, regions having a sharp change of shape within a compound cross-sectional curve profile are more likely to crack or break when compared to a tape blade with a continuous curve profile.

Figure 2:
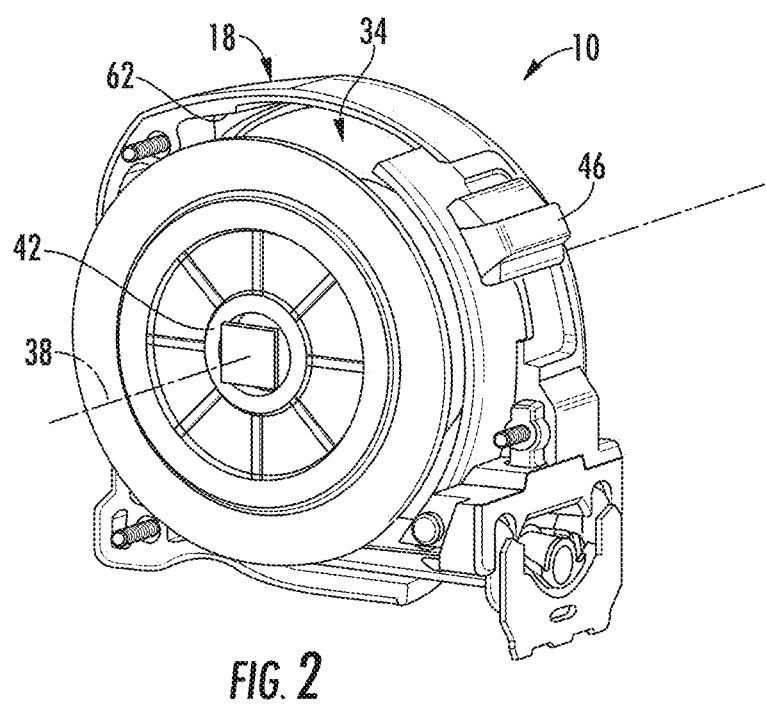
FIG. 2 is a left side perspective view of the tape measure of FIG. 1 with a portion of the tape measure housing removed, according to an exemplary embodiment.

Referring to FIG. 1 and FIG. 2, a length measurement device, such as tape measure 10, is shown according to an exemplary embodiment. Tape measure 10 includes a coilable tape blade 14 and a housing 18. In general, tape blade 14 is an elongate strip of material including a plurality of graduated measurement markings, and in specific embodiments, tape blade 14 is an elongate strip of metal material (e.g., steel material) that includes an outer most end coupled to a hook assembly, shown as hook assembly 26. As discussed in more detail below, tape blade 14 may include various coatings (e.g., polymer coating layers) to help protect tape blade 14 from cracking during whip or pinch.

Further, tape blade 14 may include any combination of tape blade features of the various embodiments discussed herein. Specifically, in various embodiments, tape blade 14 includes a steep curved profile shape as discussed below that improves tape standout performance. As shown in FIG. 1, a variable-length extended segment 22 of the tape blade 14 is retractable and extendable from the housing 18. A hook assembly 26 is fixedly coupled to an outer end portion 30 of tape blade 14.

As shown in FIG. 2, the non-extended portion of tape blade 14 is wound onto a reel 34, which is surrounded by housing 18. Reel 34 is rotatably disposed about an axis 38 of tape measure 10, and a retraction mechanism 42 is coupled to reel 34 and configured to drive reel 34 about rotation axis 38 which in turn provides powered retraction of tape blade 14. Retraction mechanism 42 may include one or more elongated spiral springs that provide the retraction energy to retraction mechanism 42. A tape lock 46 is provided to selectively engage tape blade 14, which acts to restrain retraction mechanism 42 such that extended segment 22 of tape blade 14 remains at a desired length.

Referring to FIG. 1, housing 18 includes a first side wall 50, a second side wall 54, and a peripheral wall 58 connecting first side wall 50 and second side wall 54. First side wall 50, second side wall 54, and peripheral wall 58 define an internal cavity 62, shown in FIG. 2, in which reel 34 and retraction mechanism 42 are housed. Referring to FIG. 1, first side wall 50 and second side wall 54 have a substantially circular profile 66. In other embodiments, the side walls may be rectangular, polygonal, or any other desired shape. Portions of the housing 18 may be co-molded or separately formed of a resilient material, such as a natural or synthetic rubber. In the illustrated construction, housing 18 is formed with housing bumpers 70 and a support leg 74 which extends from a lower portion 78 of the peripheral wall 58.

A slot 82 is defined along a forward portion 86 of peripheral wall 58. Slot 82 provides an opening in the tape measure housing which allows tape lock 46 to extend into housing 18. In addition, slot 82 provides a length sufficient to allow tape lock 46 to be moved relative to housing 18 between locked and unlocked positions.

Below the slot 82, a tape port 90 is provided in peripheral wall 58. Tape port 90 has an arcuate shape 94, corresponding to an arcuate cross-sectional profile of tape blade 14. The tape port 90 allows for the retraction and extension of tape blade 14 to and from the internal cavity 62 defined within housing 18.

As shown in FIGS. 1 and 2, tape measure 10 includes a finger guard assembly 98. Finger guard assembly 98 includes a guard 102 and a guard support member 106. As shown in FIG. 1, the portions of guard 102 external to housing 18 are substantially U-shaped and extend downward from housing 18. As shown in FIG. 2, when tape 14 is in the retracted position, a rear surface of hook assembly 26 abuts guard 102.

Figure 3:
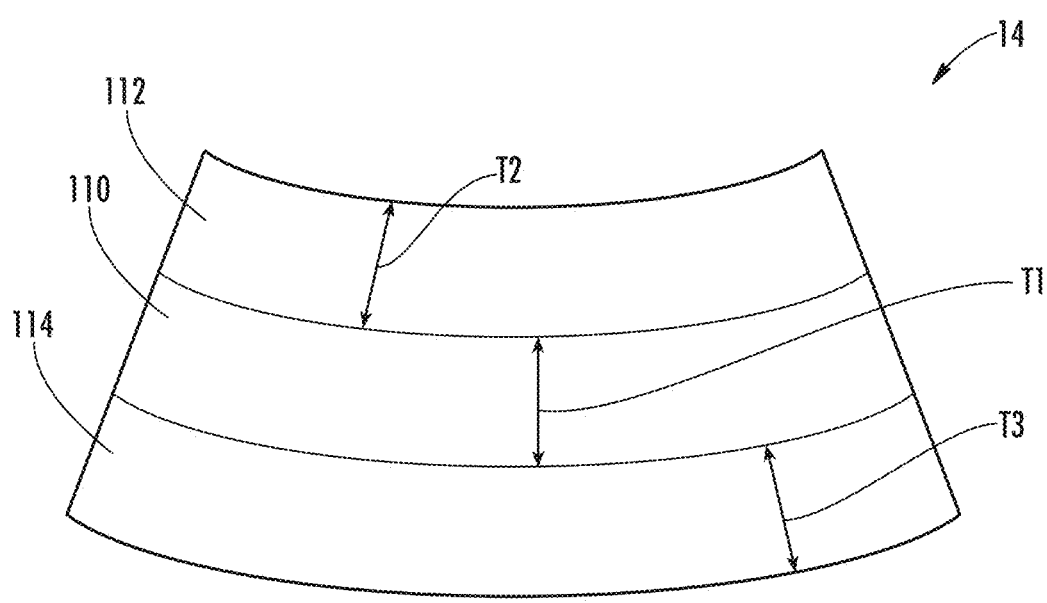
FIG. 3 is a cross-sectional view of a polymer coated tape blade of the tape measure of FIG. 1, according to an exemplary embodiment.

Referring to FIG. 3, a cross-sectional view of tape blade 14 is shown. Tape blade 14 includes a core or inner layer 110 formed from a thin, elongate strip of metal material. In a specific embodiment, inner layer 110 is formed from a strip of steel material. In a specific embodiment, inner layer 110 has a thickness, T1, of less than 0.13 mm (with up to a 25% thickness variation), specifically 0.09 mm to less than 0.13 mm (with up to a 25% thickness variation), and more specifically of 0.09 mm to 0.12 mm (with up to a 25% thickness variation). In another specific embodiment, T1 is between 0.12 mm and 0.14 mm and more specifically is between 0.125 mm and 0.135 mm. Inner layer 110 may be formed in a concavo-convex configuration (as shown in FIG. 3), which provides for improved tape standout as discussed herein. Inner layer 110 may be an alloyed spring steel, alloyed high strength steel, etc. In one embodiment, the steel is of a hardness between 50-54 RHC. In another embodiment, the steel is of a hardness between 45-60 RHC.

In various embodiments, tape blade 14 includes an upper coating layer 112 coupled to (e.g., attached, bonded, glued, etc.) the concave upper surface of inner metal layer 110 and a lower coating layer 114 coupled to (e.g., attached, bonded, glued, etc.) the convex lower surface of inner metal layer 110. In general, coating layers 112 and 114 are formed from a polymer material, and in a specific embodiment, are formed from a nylon material. In specific embodiments, coating layers 112 and 114 are formed from a material that has a modulus of elasticity less than the modulus of elasticity of the metal material of inner layer 110. In specific embodiments, coating layers 112 and 114 are formed from a material that has a hardness less than the hardness of the metal material of inner layer 110. In specific embodiments, the coating layers discussed herein are formed from a nylon 12 material and/or a nylon 6/6 material.

As shown in FIG. 3, coating layer 112 has a thickness, T2, and coating layer 114 has a thickness, T3. In specific embodiments, the total thickness of the tape blade coating (i.e., the combined thickness of layers 112 and 114, T2+T3) is greater than or less than T1. In other embodiments, the total thickness of the tape blade coating is equal to T1.

In specific embodiments, the total tape blade thickness (inclusive of all of the coating and the core layer, i.e., T1+T2+T3) is between 0.15 mm and 0.5 mm. In various embodiments, T1+T2+T3 is between 0.15 mm and 0.2 mm, and specifically is 0.18 mm. In various embodiments, T1+T2+T3 is between 0.3 mm and 0.4 mm, and specifically is 0.36 mm.

In one embodiment, coating layers 112 and 114 may be applied over the entire length of inner layer 110. In one embodiment, coating layers 112 and 114 are applied over at least 6 feet of the length of inner layer 110, specifically over at least 8 feet of the length of inner layer 110, and more specifically over at least 10 feet of the length of inner layer 110. In specific embodiments, these coating lengths are contiguous coating lengths. This may provide increased tear resistance in areas of the tape blade 14 prone to increased wear, while maintaining compactness of the tape relative to a tape blade that has the coating over the entire length. In one embodiment, coating layers 112 and 114 begin at the end of the tape blade 14 proximate the hook. In another embodiment, the coating starts at a location of the blade spaced apart from the end proximate hook assembly 26.

In some embodiments, coating layers 112 and/or 114 do not have uniform thicknesses along the width and/or length of tape blade 14. In some such embodiments, coating layers 112 and/or 114 may be applied in a pattern (e.g., a honeycomb pattern, a checkered pattern, etc.) where there are portions of thicker and thinner coating distribution across both the length and width of the tape blade 14. In such embodiments, T2 and T3 shown in FIG. 3 represent the thickness measured through the thickest portion of the coating pattern. In some such embodiments, the ranges of T2 and T3 discussed herein represent the maximum thickness of coating layers 112 and 114 at any portion along the length of tape blade 14. In some such embodiments, the combined maximum coating and blade thickness may be 0.4 mm, but in other areas along the length and width of the tape blade, the coating and blade thickness will be less (e.g., as measured at the thinner coating portions of the coating pattern). In other embodiments, the ranges of T2 and T3 discussed herein represent the average thickness of coating layers 112 and 114 measured at all of the thickest portions of the coating pattern along the length and width of tape blade 14.

Coating layers 112 and 114 may be applied as a laminate, nylon extrusion, film attached with adhesive, power/spray on coating. In one embodiment, the coating layer(s) are configured such that even if the steel core were to fracture, the coating layer is configured to contain the steel core and to maintain the integrity of the blade (e.g., the coating will tend not to tear).

In various embodiments, tape blade 14 and the profile shapes discussed herein can be utilized to improve tape standout in tapes having a variety of lengths. In specific embodiments, the length of the tape blade is less than 50 feet or more specifically less than 40 feet. In various embodiments, the length of tape blade 14 is between 15 ft. and 40 ft., and in specific embodiments, the length of the tape blade is 35 ft., 30 ft., 25 ft., or 16 ft.

Figure 4:
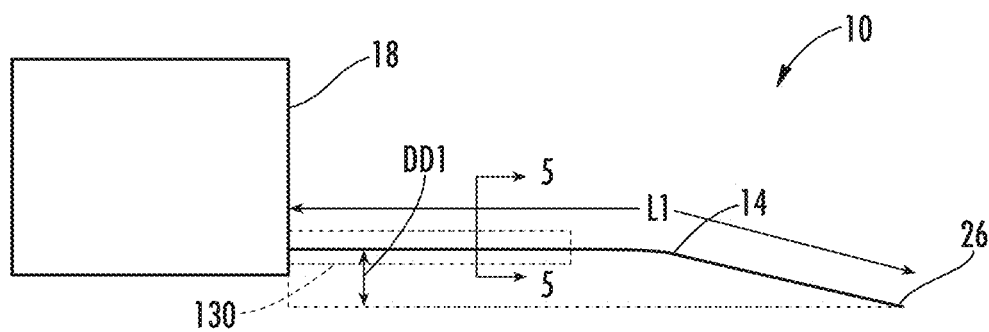
FIG. 4 is a schematic side view of the tape measure of FIG. 1 with a portion of the tape blade extended from the tape housing, according to another exemplary embodiment.
Figure 5:
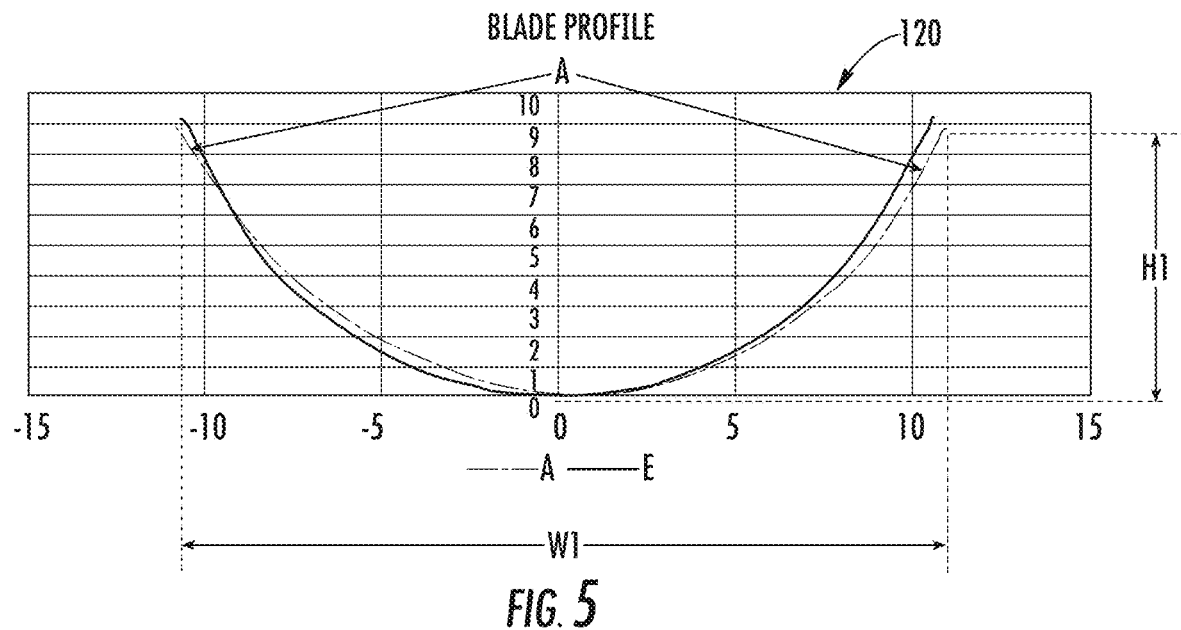
FIG. 5 is a cross-sectional view showing the profile of a tape blade, according to an exemplary embodiment.
Figure 19:
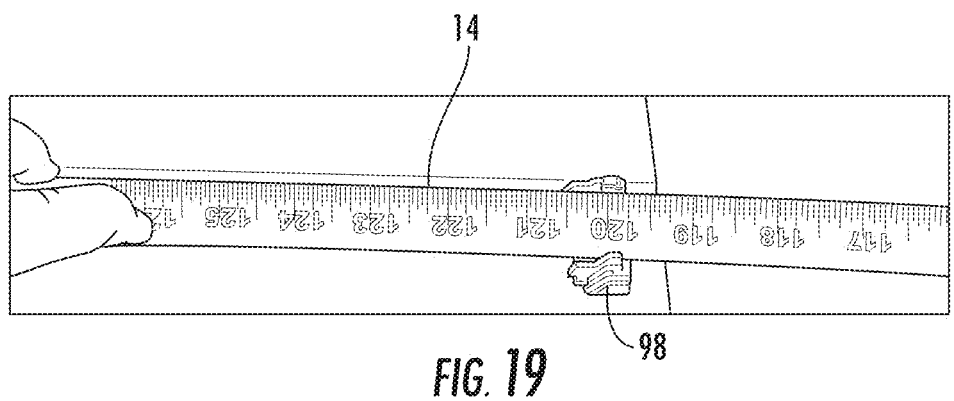
FIGS. 19 and 20 are photographs showing a droop measurement test, according to an exemplary embodiment.
Figure 20:
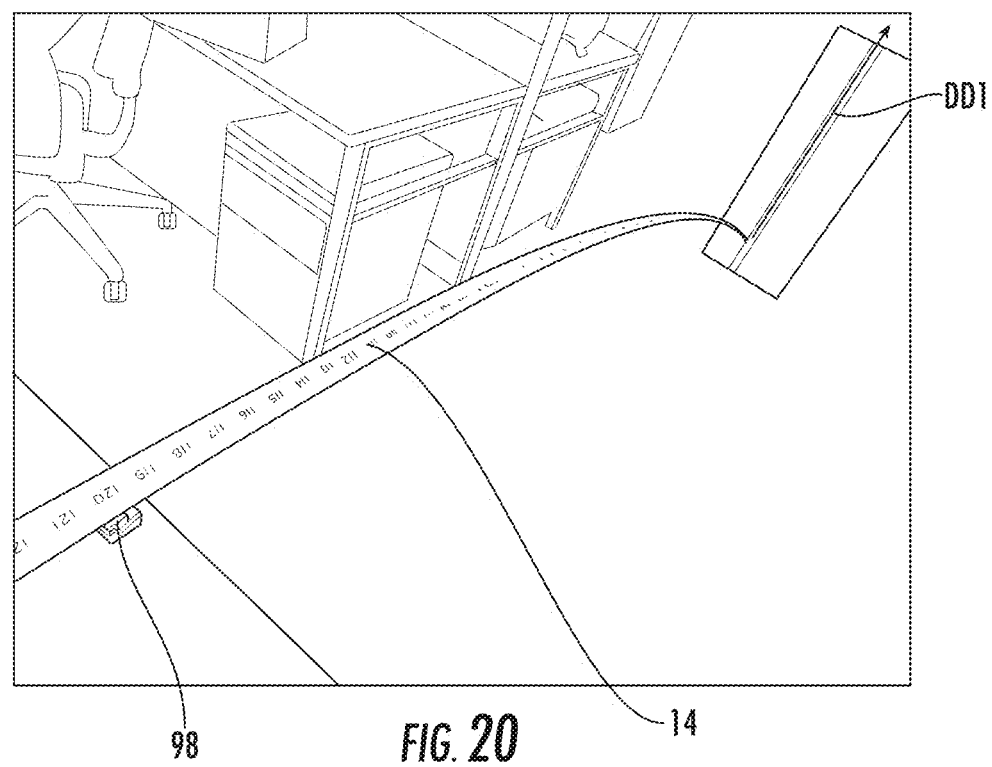

Referring to FIG. 4 and FIG. 5, tape blade 14 standout, droop and the cross-sectional profile shape parameters of the tape blade profile of the present disclosure are shown and described. In general, tape standout distance is the maximum length, L1, of tape blade 14 that can be extended from tape housing 18 when the tape housing 18 is positioned such that the tape blade exits the housing in a direction perpendicular to gravity while self-supporting its own weight without buckling and without additional support being provided other than what the tape measure housing itself provides (e.g., without the tape blade being supported by the user's hand). It should be noted that while tape blade standout can be measured using a variety other methods for other purposes (such field testing, marketing, etc.), tape standout distance, as used herein, is determined via preceding test procedure. In one embodiment, droop is measured as shown in FIGS. 19 and 20. Droop distance, shown as DD1, is the vertical distance that the hook end 26 of tape blade 14 moves downward from the opening in tape housing, when a certain length of tape L1 is extended from tape housing 18 and while tape blade 14 is self-supporting. In the test shown in FIGS. 19 and 20, droop is measured with tape blade 14 supported on the support portion of the associated tape measure housing, such as guard assembly 98 of tape measure 10 discussed above. As shown in FIG. 4, L1 is the tape length extending from housing 18.

Referring to FIG. 5, the curvature profile 120 of tape blade 14 is shown according to an exemplary embodiment. In general the curvature profiles, such as profile 120, discussed herein are measured via a laser profilometer along the upper surface of coating layer 112. However, because in at least some embodiments, coating layer 112 is of a consistent thickness the profile of coating layer 112 discussed herein also generally reflects the shape of the steel core 110 of tape blade 14.

As discussed in detail herein, Applicant has found that a curvature profile 120 having one or more of the curvature shape features discussed and quantified below is effective at increasing standout and/or decreasing droop. This is particularly true given a tape blade 14 having a relatively low flat tape width and relatively low steel thickness, but is also true for wider tape blades having conventional thicknesses. While curvature profile 120 can be described and classified in a wide variety of ways, Applicant has determined that curved profile height, H1, curved profile width, W1, and a cross-sectional angle A, can be used to classify and quantify the profile shape parameters that improve standout performance. In addition, Applicant has determined that H1, W1 and angle A when evaluated in relation to flat tape blade width and steel thickness define relative parameters that quantify the standout improving profile shapes discussed herein. Various embodiments of curvature profile 120 and tape blade 14 are shown in Table 1, Table 2, Table 3 and Table 4 and FIGS. 7-13 and 18 below.

In various embodiments, the flat width of tape blade 14 is between 20 mm and 40 mm. In specific embodiments, the flat width of tape blade 14 is 25 mm to 32 mm. In specific embodiments, the flat width of tape blade 14 is 25 mm, 27 mm, 30 mm, 32 mm, 33 mm or 35 mm. The thickness of the metal inner core 110 (T1 discussed above) and of the coated tape blade 14 are as discussed above regarding FIG. 3.

W1, particularly when compared to the flat width of tape blade 14, provides an indication of the extent to which tape blade 14 is formed into a curved shape. In various embodiments, W1 is less than 23.5 mm, specifically is between 15 mm and 23.5 mm, and more specifically is between 20 mm and 23 mm. In even more specific embodiments, W1 is between 21 mm and 22 mm.

In various embodiments, because profile 120 is substantially more curved than the typical tape blade, the ratio of W1 to flat tape width is substantially less than is typical, and this is particularly true for tape blades of a relatively low steel thickness. In specific embodiments, the ratio of W1 to flat tape width is less than 0.8, specifically is less than 0.745 and more specifically is less than 0.73. In specific embodiments, the ratio of W1 to flat tape width is between 0.6 and 0.8 and more specifically is between 0.7 and 0.73.

In addition, H1 particularly when compared to the flat width of tape blade 14, provides an indication of the extent to which tape blade 14 is formed into a curved shape. In various embodiments, H1 is greater than 7 mm, specifically is between 7 mm and 10 mm, and more specifically is between 8.5 mm and 9.5 mm. In even more specific embodiments, H1 is between 8.8 mm and 9.4 mm.

In various embodiments, because profile 120 is substantially more curved than the typical tape blade, the ratio of H1 to flat tape width is substantially larger than is typical, and this is particularly true for tape blades of a relatively low steel thickness. In specific embodiments, the ratio of H1 to flat tape width is greater than 0.285, specifically is greater than 0.29 and more specifically is greater than 0.295. In specific embodiments, the ratio of H1 to flat tape width is between 0.29 and 0.32 and more specifically is between 0.295 and 0.317.

Applicant has determined that as steel thickness T1 of tape blade 14 decreases, the degree of curvature of tape blade 14 increases to achieve a certain level of standout to account for the lower rigidity of the thin steel. Accordingly, Applicant has determined that in order to both decrease tape blade steel thickness while improving standout, a suitable ratio of height to steel thickness, T1 should be selected. Accordingly, given the steep curvature of profile 120, the ratio of H1 to steel thickness is substantially larger than is typical. In specific embodiments, the ratio of H1 to T1 is greater than 65, specifically is greater than 75 and more specifically is greater than 80. In specific embodiments, the ratio of H1 to T1 is between 75 and 85 and more specifically is between 80 and 85.

In various embodiments, angle A also provides an indication of the extent to which tape blade 14 is formed into a curved shape. As shown in FIG. 5, angle A is the angle measured between lines tangential to the laterally outermost sections of tape blade 14 when viewed in longitudinal cross-section, and a smaller angle A represents a steeper curve formed in tape blade 14. In other embodiments, angle A is the interior angle measured between the widthwise midpoint of tape blade 14 and any two points along the tape blade within 5 mm of the left and right widthwise ends of the tape blade. In various embodiments, angle A is less than 90 degrees. In various embodiments, angle A is less than 75 degrees, specifically is less than 65 degrees and more specifically is less than 58 degrees. In a specific embodiment, angle A is between 45 and 58 degrees. In any of these embodiments, angle A may also be greater than 45 degrees. Additional embodiments of tape blades with different angles A and the relation to readability are shown in Appendix B.

In various embodiments, because profile 120 is substantially more curved than the typical tape blade, the ratio of angle A to flat tape width is substantially less than is typical, and this is particularly true for tape blades of a relatively low steel thickness. In specific embodiments, the ratio of angle A to flat tape width is less than 3 degrees/mm, specifically is less than 2.7 degrees/mm, and more specifically is less than 2.1 degrees/mm. In specific embodiments, the ratio of angle A to flat tape width is between 1.85 degrees/mm and 3 degrees/mm, specifically is between 1.85 degrees/mm and 2.7 degrees/mm and more specifically is between 1.85 degrees/mm and 2.1 degrees/mm.

In various embodiments, tape blade 14 may have one or more of the profile dimensions or relative dimensions discussed above, and in specific embodiments, tape blade 14 may have one or more of the profile dimensions or relative dimensions discussed above in combination with any of the other tape blade features or dimensions discussed herein. In particular, in various embodiments, any of the profile dimensions discussed above are provided with a tape blade 14 having a thickness T1 that is less than 0.13 mm, specifically between 0.09 mm and 0.13 mm, specifically less than 0.125 mm, more specifically between 0.09 mm and 0.12 mm, and even more specifically between 0.105 mm and 0.115 mm. In such embodiments, tape thickness is decreased while providing high levels of standout via the profile shapes discussed herein. Applicant believes that conventional tape blades in these thickness ranges do not have the profile shape parameters as discussed herein and therefore do not achieve the high levels of standout and low levels of droop discussed herein. However, in other embodiments, tape blade 14 may have a steel thickness typically in conventional tape blades (e.g., 0.13 mm), and by utilizing the various tape blade profiles discussed herein, very high levels of standout can be achieved compared to tape blades having a conventional profile.

In a specific embodiment, tape blade 14 has a flat width less than 27.94 mm and has standout of greater than 115 inches, specifically greater than 120 inches, more specifically greater 125 inches and more specifically greater than 130 inches. In a specific embodiment, tape blade 14 has a flat width less than 27.94 mm and a curved height, H1, greater than 6.3 mm. In a specific embodiment, tape blade 14 has a flat width less than 27.94 mm and a curved width, W1, less than 22.5 mm. In a specific embodiment, tape blade 14 has a flat width less than 27.94 mm, a curved width, W1, less than 22.5 mm and a curved height, H1, greater than 6.3 mm. In some such embodiments, tape blade 14 has an angle A (defined below) less than 90 degrees. Applicant believes that a tape blade having a flat width less than 27.94 mm has not been achieved previously with this high level of standout, and that Applicant's curved profile having H1 and/or W1 described above are the shape parameters that allow such standout despite the relatively narrow tape blade.

In other specific embodiments, tape blade 14 has a tape blade 14 that has a metal thickness, T1, of less 0.13 mm, specifically between 0.09 mm and 0.13 mm, and has standout of greater than 115 inches, specifically greater than 120 inches, more specifically greater 125 inches and more specifically greater than 130 inches. In some embodiments, the tape blade 14 has standout of greater than 144 inches, greater than 156 inches, greater than 159 inches, greater than 162 inches, greater than 165 inches, or greater than 168 inches. In a specific embodiment, tape blade 14 has a metal thickness, T1, as discussed herein and a curved height, H1, and H1 is greater than 6.3 mm. In a specific embodiment, tape blade 14 has a metal thickness, T1, of less 0.13 mm and W1, less than 22.5 mm. In a specific embodiment, tape blade 14 has a metal thickness, T1, of less 0.13 mm, and a curved width, W1, less than 22.5 mm and a curved height, H1, greater than 6.3 mm. In some such embodiments, the flat width of the tape blade is between 22 mm and 33 mm, and specifically is between 29 mm and 32 mm. In alternative embodiments, the flat width of the tape blade 14 is greater than 33 mm. For example, the flat width of the tape blade 14 is between 35 mm and 38 mm. In yet other embodiments, the flat width of tape blade 14 may be greater than 38 mm. In some such embodiments, the tape blade has an angle A (defined below) less than 90 degrees. Applicant believes that a tape blade having a thickness of less than 0.13 mm has not been achieved previously with this high level of standout, and that Applicant's curved profile having H1 and/or W1 described above are the shape parameters that allow such standout despite the relatively thin tape blade.

Figure 6:
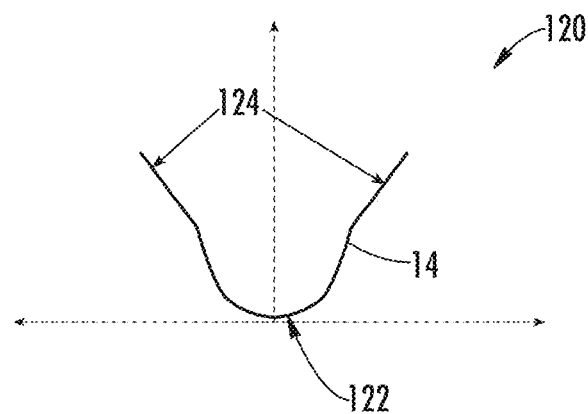
FIG. 6 is a cross-sectional view showing the profile of a tape blade, according to an exemplary embodiment.

Referring to FIG. 6, profile 120 is shown according to an exemplary embodiment. In FIG. 6 the relative position between the central section 122 of profile 120 and the widthwise outer sections 124 of profile 120 is exaggerated to better demonstrate the shape of profile 120. As shown in the embodiment of FIG. 6, profile 120 is not a continuous curve. In this embodiment, the upper surfaces of outer sections 124 have a greater radius of curvature than central section 122. This results in outer sections 124 being less curved which improves visibility of markings and numbers located along tape blade 14 within profile 120. In addition, outer sections 124 are more horizontally positioned than they would be in a profile in which the curvature of central section 122 continues outward to both lateral edges of tape blade 14.

Referring back to FIG. 4, in various embodiments, profile 120 is formed in a lengthwise subsection 130 of the total length of tape blade 14. In a specific embodiment, profile 120 is formed in the portion of tape blade 14 that tends to buckle during standout, and thus the increased rigidity provided by profile 120 in this region increases standout distance and/or decreases droop. Specifically, profile 120 is formed in a lengthwise sub-section 130 of tape blade 14 that is located adjacent to housing 18 when the amount of tape extended is approaching the maximum standout. Thus, while the positioning of profile 120 will vary somewhat depending on the standout length of a particular tape blade design, in general, lengthwise sub-section 130 extends from 5 feet to 15 feet from the hook end of tape blade 14. In a specific embodiment, lengthwise sub-section 130 extends from 6.5 feet to 13 feet from the hook end of tape blade 14. In an even more specific embodiment, when tape blade 14 is at its maximum standout length, subsection 130 extends 5 feet from housing 18 along the length of tape blade 14 toward hook end 26.

In various embodiments, by forming tape blade 14 having profile 120 characterized via one or more of the profile dimensions discussed above, Applicant believes that significantly improved standout and droop decrease are achieved. In various embodiments, standout of tape blade 14 provided at least in part by profile 120 is greater than 115 inches, specifically greater than 120 inches, more specifically greater than 125 inches and more specifically greater than 130 inches. In various embodiments, standout of tape blade 14 provided at least in part by profile 120 is greater than 144 inches, specifically is greater than 150 inches, and more specifically is greater than 155 inches. In various embodiments, droop of a 10 foot section of tape blade 14 is less than 33 inches, specifically is less than 30 inches, and more specifically is less than 28 inches. In a specific embodiment, standout of tape blade 14 provided at least in part by profile 120 is 156-160 inches and droop of a 10 foot section of tape blade 14 is between 22-25 inches.

In various embodiments, tape blade 14 has a curved profile 120 defined by the following parameters: a flat width of the elongate metal core of less than 32 mm, a ratio of the curved width to a flat width of the elongate metal core of less than 0.74 and a ratio of the curved height to the flat width of the elongate metal core of greater than 0.29, and in such embodiments, tape blade 14 has a standout distance of the elongate blade from the housing that is greater than 150 inches. In other embodiments, tape blade 14 has a curved profile 120 defined by the following parameters: wherein a flat width of the elongate metal core of 32 mm or greater, a ratio of the curved width to a flat width of the elongate metal core of less than 0.70, a ratio of the curved height to the flat width of the elongate metal core of greater than 0.31, and in such embodiments, tape blade 14 has a standout distance of the elongate blade from the housing of greater than 150 inches.

In various embodiments, tape blade 14 has a curved profile 120 that provides for improved standout for a given tape blade flat width. In various embodiments, tape blade 14 has a flat width of 30 mm or less, a curved width that is less than the flat width and a standout distance of at least 132 inches, specifically greater than 138 inches, and more specifically greater than 144 inches. In various embodiments, tape blade 14 has a flat width greater than or equal to 29 mm and less than 32 mm, a curved width that is less than the flat width and a standout distance of at least 156 inches and more specifically greater than 160 inches. In various embodiments, tape blade 14 has a flat width greater than 32 mm, a curved width less than the flat width and a standout distance of the elongate blade from the housing of at least 168 inches. In various embodiments, the tape blade standout distance is greater than the various lengths disclosed herein and is also less than 400 inches, specifically less than 300 inches, more specifically is less than 250 inches or even less than 200 inches.

In addition to the tape blade profile geometry, Applicant believes that other properties of the tape blade may influence or improve standout. For example, Applicant's investigation into tape blade standout has shown that the standout performance of a tape blade is also related to the tape blade material (e.g., steel in the tape blades investigated by Applicant) having sufficient elasticity so that it does not experience plastic deformation during its typical stress states (standout buckling, winding onto spool, etc.). In some instances, the standout performance of a tape blade depends, at least in part, on the steel of the blade having sufficient elasticity such that the blade does not experience plastic deformation during typical stress states (e.g., standout buckling, winding onto a spool, etc.). The elasticity can be increased, decreased, controlled, adjusted, etc. via any suitable method. In some instances, increasing the elasticity of the steel may also decrease the standout of the blade but allow for the blade to have less degradation in standout over time (e.g., after being extended and retracted from the housing, after being stored on the spool, etc.). Similarly, decreasing elasticity of the blade may allow greater initial standout of the blade, but may decrease the standout over time. In some instances, residual stresses may be added to increase the elastic range of the steel in bending. Further, in some instances, increasing the hardness of the steel may increase the standout of the blade. For example, the blade steel may have a hardness of up to 70 HRC.

Test Examples

The droop and standout ranges for four specific inventive tape profiles with different tape widths, blade thicknesses and coating thickness are shown below along with the profile dimensions (e.g., curve height, angle) for each profile design. The standout and droop data shown in Table 1 was determined via testing of the identified tape measures, and the profile measurements were measured using a laser profilometer measurement along the upper most surface of the tape blade of each tape measure. For this testing, droop was measured as shown in FIGS. 19 and 20. These are compared against three conventional tape measure designs. As shown below, the profile designs discussed herein provide for significantly decreased droop and increased standout as compared to the conventional tape measures. In Table 1 below, tape designs A-D represent specific designs having the rigidity increasing curvature as discussed herein, and the next three rows show corresponding data for three tape blade designs of three tape measures available from Milwaukee Electric Tool Corporation currently on the market. The last three rows show corresponding data from three prior art competitor tape measures. As can be seen from Table 1, the designs having the rigidity increasing profile discussed herein greatly increase standout and decrease droop, particularly for a given flat width and/or steel thickness.

TABLE 1

| Tape Design | Flat Width (mm) | Steel Thickness (mm) | Total Thickness (mm) | Angle-Laser (deg) | Curved Height-Laser (mm) | Curved Width-Laser (mm) | Droop @ 10 ft (in) | Stand-out (in) |
|---|---|---|---|---|---|---|---|---|
| A | 30 | 0.11 | 0.18 | 57.39 | 8.8515 | 21.85 | 22-25 | 156-160 |
| B | 30 | 0.11 | 0.18 | 62.71 | 9.074 | 21.5 | 20-23 | 160-162 |
| C | 30 | 0.11 | 0.36 | 49.68 | 9.348 | 21.15 | 23-25 | 159-164 |
| D | 27 | 0.11 | 0.36 | 72.42 | 7.5385 | 21.151 | 25-27 | 133-135 |
| Milwaukee Electric Tool Prod. No. 48-22-7116 | 27 | 0.13 | 0.19 | 96.26 | 5.904 | 23.4 | N/A | 108-112 |
| Milwaukee Electric Tool Prod. No. 48-22-7135 | 27 | 0.12 | 0.19 | 91.12 | 6.281 | 22.8 | N/A | 110-114 |
| Milwaukee Electric Tool Prod. No. 48-22-7526 | 32 | 0.13 | 0.18 | 58.48 | 8.986 | 23.9 | 34-36 | 142-146 |
| Prior Art Tape No. 1 | 31.75 | 0.13 | 0.18 | 62 | 9.1835 | 23.651 | 31-32 | 145 avg |
| Prior Art Tape No. 2 | 31.75 | 0.13 | 0.22 | 64 | 9.166 | 23.601 | 28-29 | 149 avg |
| Prior Art Tape No. 3 | 31.75 | 0.13 | 0.18 | 88 | 7.9675 | 26.05 | 32-33 | 138 avg |

Table 2 below calculates various ratios related to the tape profiles dimensions shown in Table 1 that Applicant believes further quantifies the high level of rigidity provided by the tape blade curvature profiles as discussed herein.

TABLE 2

| Tape Design | Ratio - Height/Flat Width | Ratio - Height/Steel Thickness | Ratio - Curved Width/Flat Width | Ratio - Angle/Flat Width |
|---|---|---|---|---|
| A | 0.29505 | 80.46818182 | 0.728333333 | 1.913 |
| B | 0.302466667 | 82.49090909 | 0.716666667 | 2.0903333 |
| C | 0.3116 | 84.98181818 | 0.705 | 1.656 |
| D | 0.279203704 | 68.53181818 | 0.78337037 | 2.6822222 |
| Milwaukee Electric Tool Prod. No. 48-22-7116 | 0.218666667 | 45.41538462 | 0.866666667 | 3.5651852 |
| Milwaukee Electric Tool Prod. No. 48-22-7135 | 0.23262963 | 52.34166667 | 0.844444444 | 3.3748148 |
| Milwaukee Electric Tool Prod. No. 48-22-7526 | 0.2808125 | 69.12307692 | 0.746875 | 1.8275 |
| Prior Art Tape No. 1 @ 12 ft. | 0.289244094 | 70.64230769 | 0.744913386 | 1.9625197 |
| Prior Art Tape No. 2 @ 12 ft. | 0.288692913 | 70.50769231 | 0.743338583 | 2.0179528 |
| Prior Art Tape No. 3 @ 12 ft. | 0.250944882 | 61.28846154 | 0.820472441 | 2.7672441 |

As shown in Table 1 and Table 2, in various embodiments, tape standout of greater than 130 inches, specifically greater than 150 inches, and more specifically greater than 155 inches is achieved utilizing the various tape profiles as discussed herein.

Figure 7:
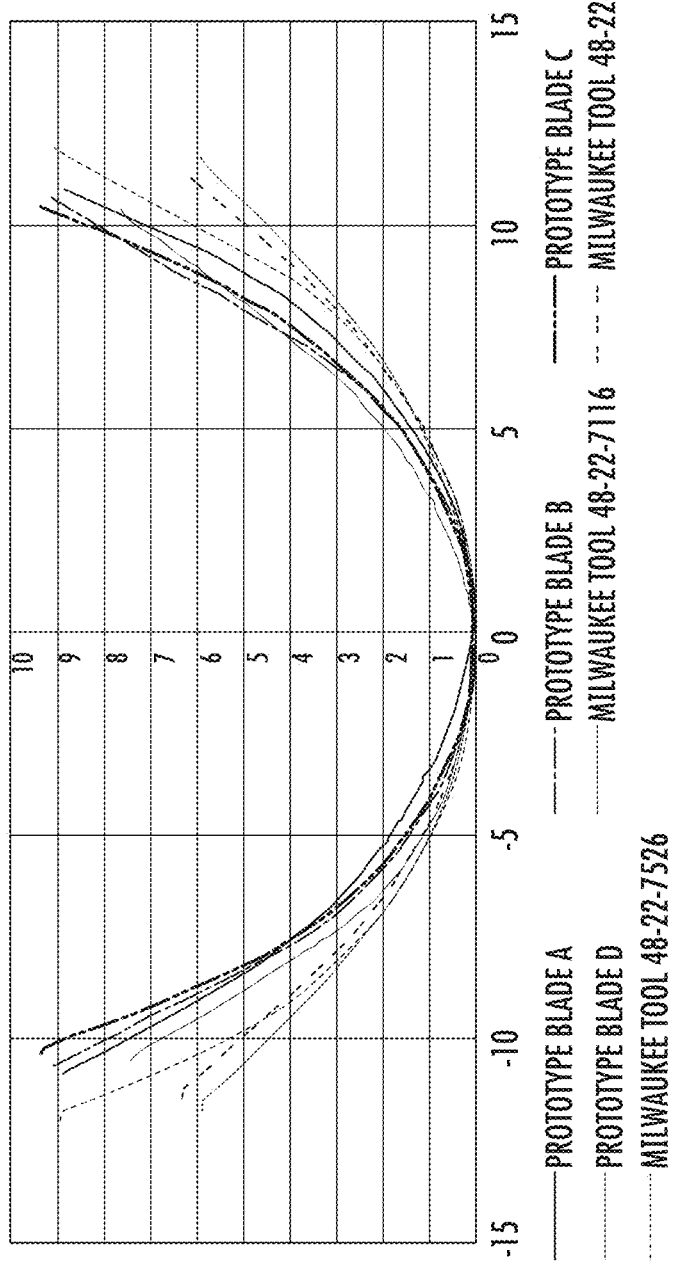
FIG. 7 is a plot of four tape blade profiles of the present disclosure plotted relative to the profiles of three prior art tape measures.
Figure 8:
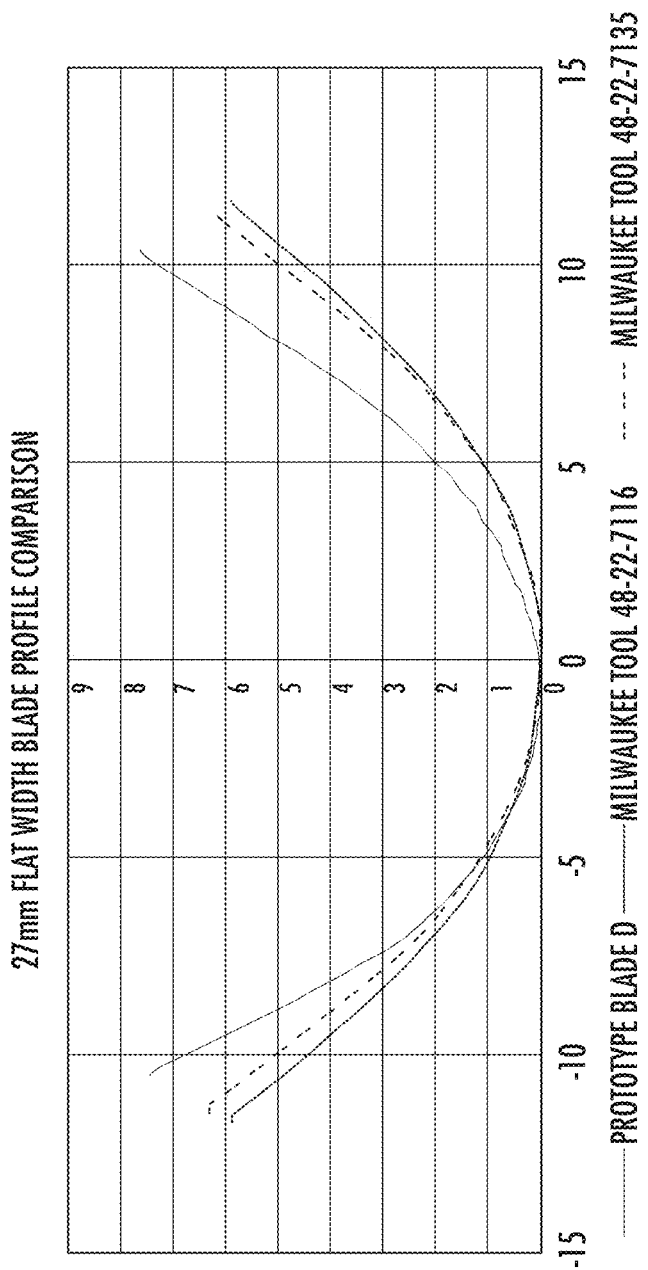
FIG. 8 is a plot of one of the tape blade profiles of the present disclosure plotted relative to the profiles of two prior art tape measures.

FIG. 7 shows cross-sectional profiles of tapes A-D from Table 1 and Table 2 plotted relative to the three Milwaukee Tool prior art tape measures. FIG. 8 shows the profile of tape D plotted relative to the profile of the Milwaukee Electric Tool Prod. No. 48-22-7116 and of Milwaukee Electric Tool Prod. No. 48-22-7135. FIG. 8 shows the more steep profile of tape D relative to the two other currently available tape measures that also have a 27 mm flat width tape blade.

Figure 9:
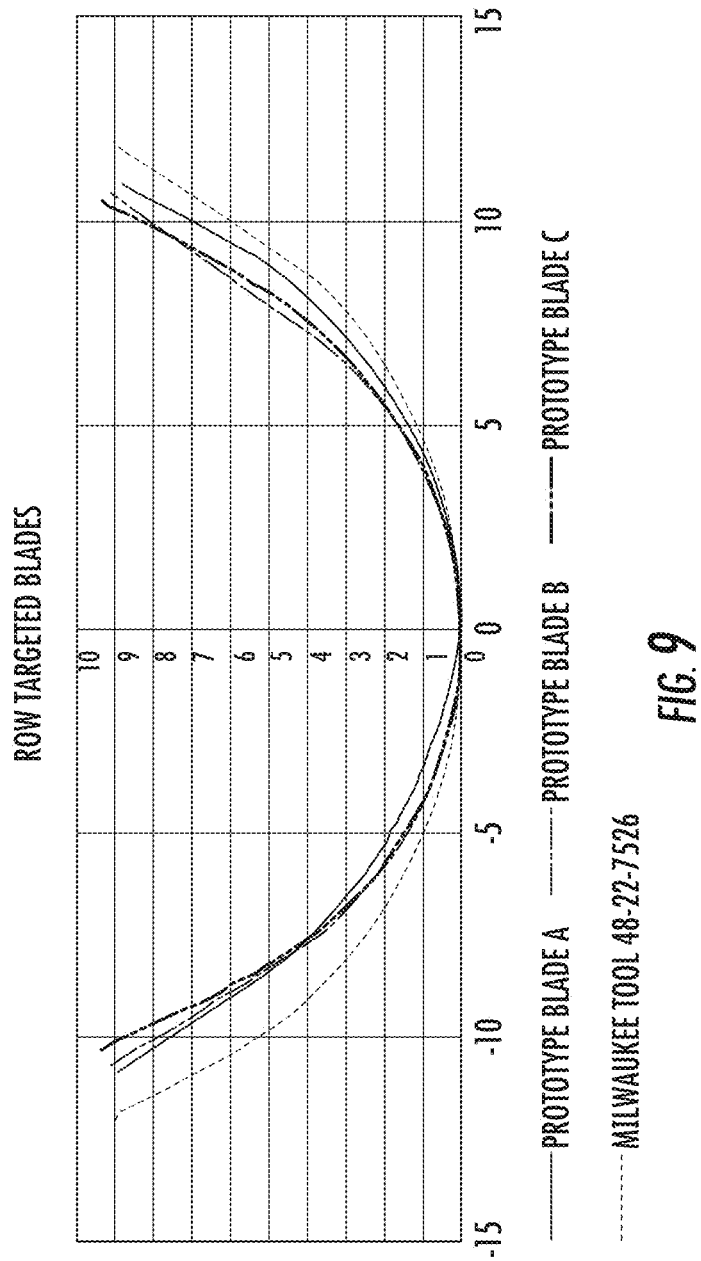
FIG. 9 is a plot of four tape blade profiles of the present disclosure plotted relative to the profile of one prior art tape measures.

FIG. 9 shows the profile of tapes A, B and C plotted relative to the 32 mm flat width 8 m CAWB tape that is currently available. This figure shows the more steep profiles of tapes A, B and C relative to the profile of the Milwaukee Electric Tool Prod. No. 48-22-7526 tape.

Figure 10:
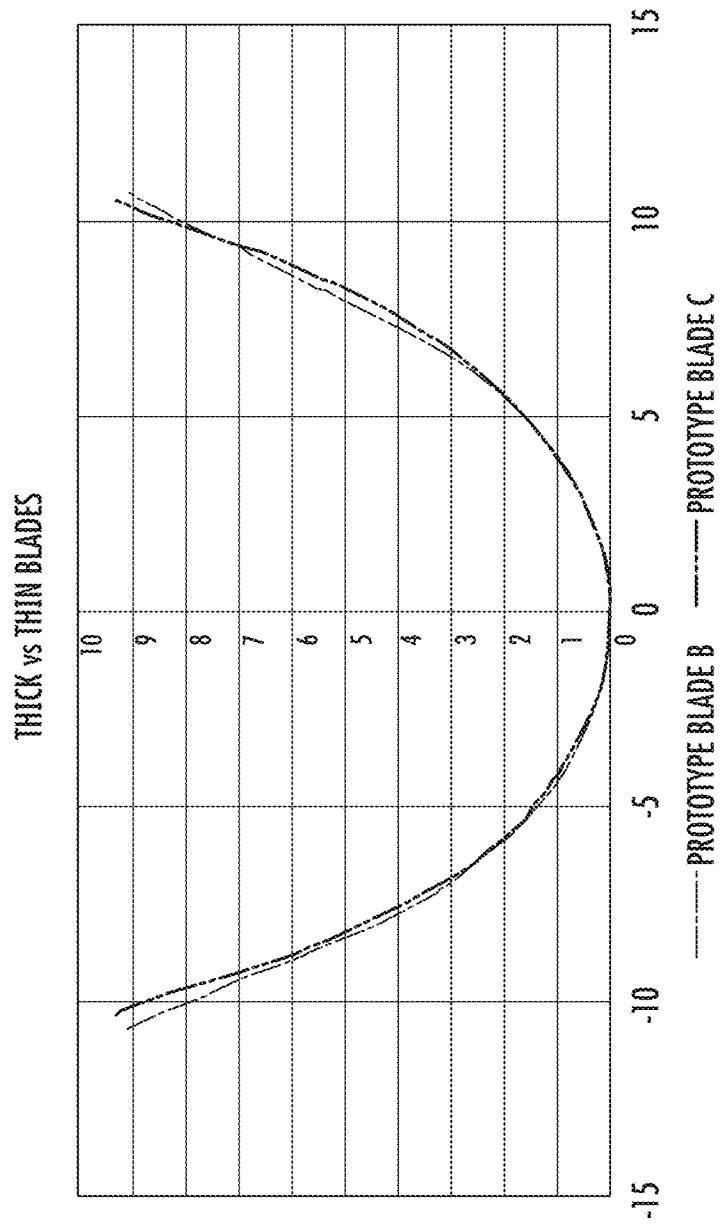
FIG. 10 is a plot of two tape blade profiles of the present disclosure plotted relative to each other.
Figure 11:
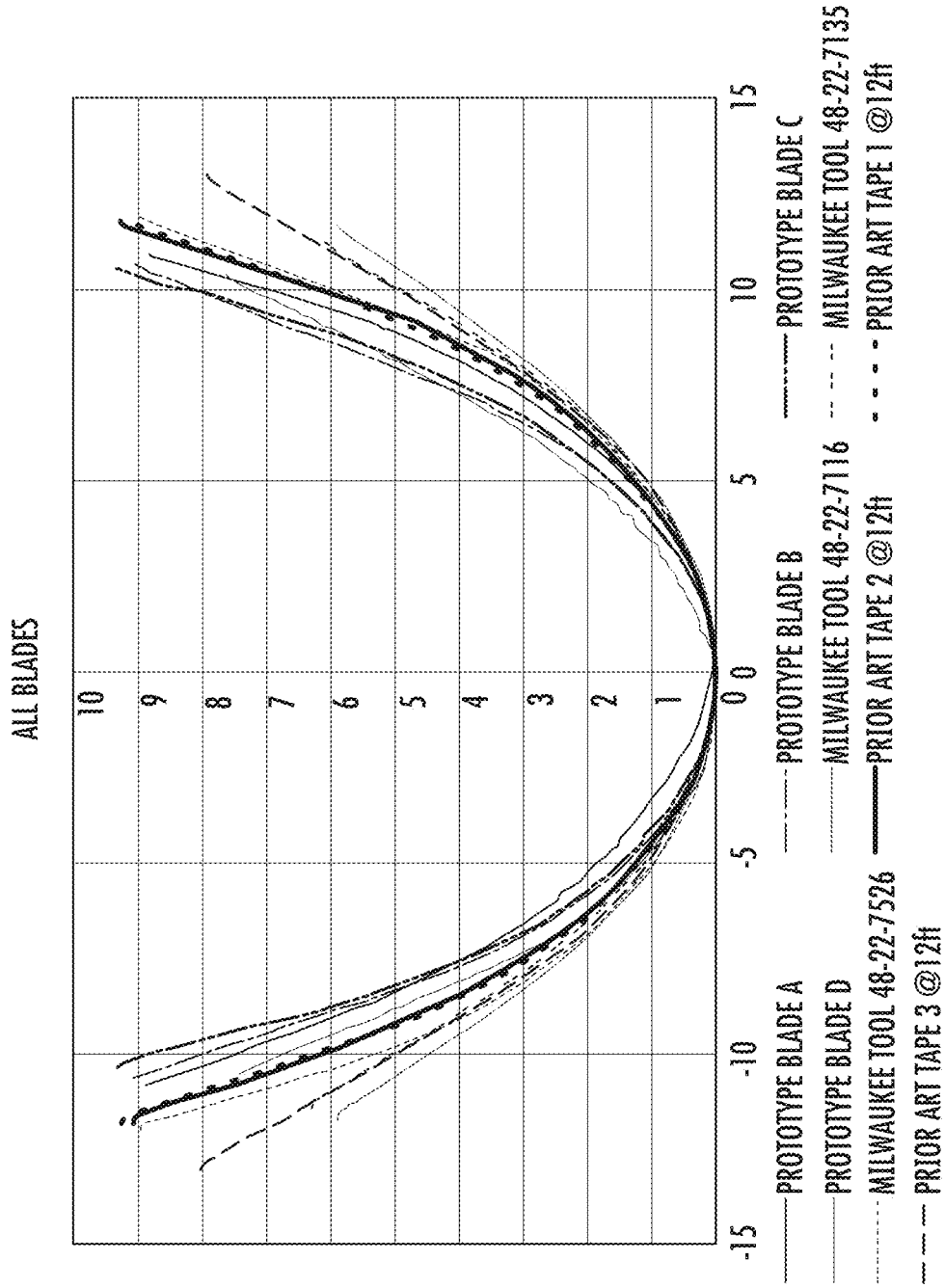
FIG. 11 is a plot of four tape blade profiles of the present disclosure plotted relative to the profiles of six prior art tape measures.
Figure 12:
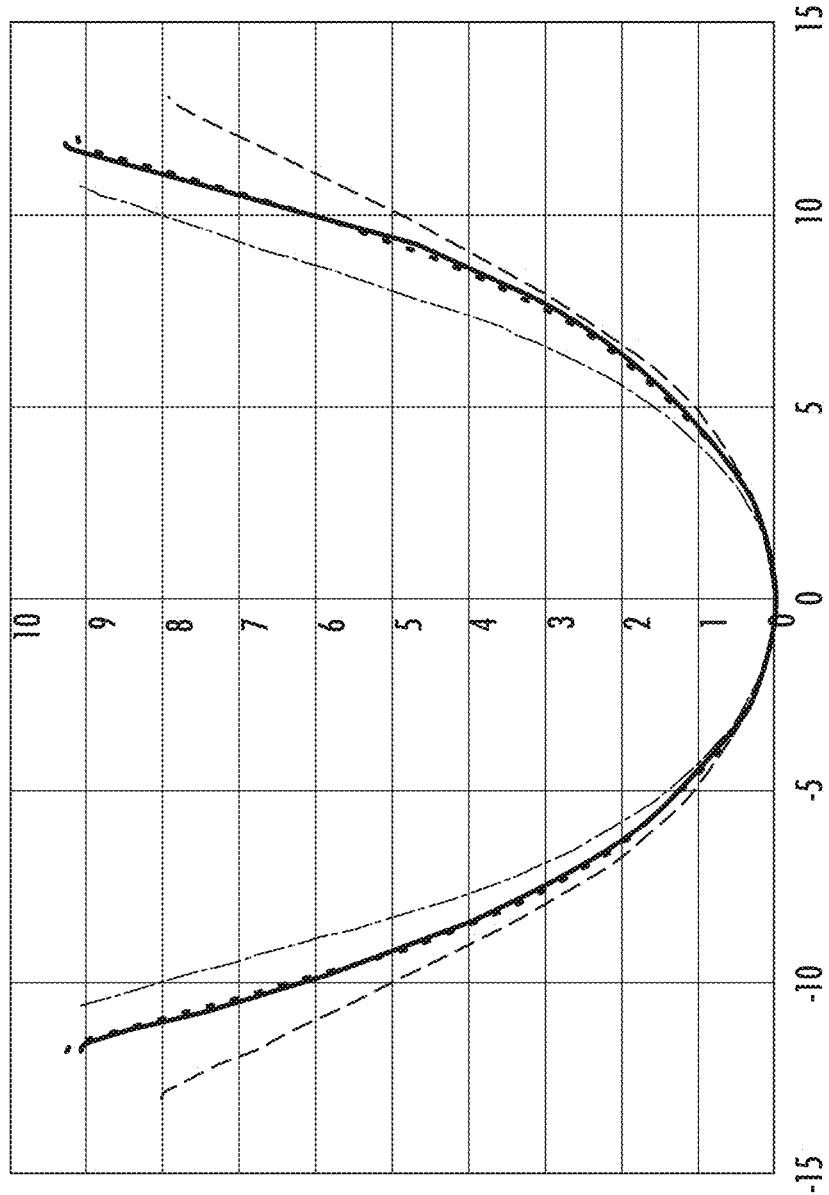
FIG. 12 is a plot of one of the tape blade profiles of the present disclosure plotted relative to the profiles of three prior art tape measures.

FIG. 10 shows the profile of tape B compared to tape C. As shown in Table 1, tape B and tape C both have the same flat tape width and the same steel thickness. However, tape C has a thicker polymer coating layer as shown in the total tape thickness column. Thus, FIG. 10 demonstrates that a more steep curved profile of tape C is needed to maintain standout as coating layer thickness (and hence weight of tape blade) increases. FIG. 11 shows the plotted profile of all tapes in Table 1, and FIG. 12 shows tape B of the present disclosure plotted relative to three prior art tape blades.

Additional Tape Blade Profile Designs

Referring to FIGS. 13-16 and Table 3 below, Applicant has developed a variety of additional new tape blade profile designs that, based on Applicant's modeling, allow for a variety of tape measure design/performance parameters to be strategically selected or optimized to achieve a combination of performance parameters not believed achievable with previous designs. In particular, Applicant has determined that by selecting the tape blade width and the tape blade profile shape, the amount of tape blade standout and the amount of torque needed to retract the tape blade can be selected to achieve blade standout and retraction torque requirements not previously achievable.

For example, Applicant has determined that, for a given tape blade thickness, standout can be increased by making the profile of the tape blade more curved and/or making the tape blade wider. Further, Applicant understands conventional tape blade design wisdom indicates that both methods of increasing standout (e.g., increasing width or increasing curved shape) also requires an increase in retraction torque (e.g., a stronger retraction spring) in order to fully retract the wider and/or more curved tape blade. However, in contrast to this conventional wisdom, Applicant's tape blade design and modeling work has unexpectedly discovered a variety of tape blade widths and curvatures that provide for increased standout (for a tape blade of a given thickness) without substantially altering the increasing torque that needs to be delivered by the retraction system to rewind the spring.

TABLE 3

| Design Parameter | Prior Art 1 (CAWB 78 deg) | Prior Art 2 (CAWB 55 deg) | Prototype 1 (35 FW Deep) | Prototype 2 (38 FW Deep) | Prototype 3 (35 FW) | Prototype 4 (38 FW) | Prototype 5 (35 Super Deep) | Prototype 6 (38 Super Deep) |
|---|---|---|---|---|---|---|---|---|
| Thickness (mm) | 0.13 | 0.13 | 0.13 | 0.13 | 0.13 | 0.13 | 0.13 | 0.13 |
| Flat Width (mm) | 32 | 32 | 35 | 38 | 35 | 38 | 35 | 38 |
| arc angle center (deg) | 102.23 | 108.916 | 110 | 112.5 | 102 | 104 | 108.916 | 108.916 |
| Radius at center | 11.57 | 10.37 | 10.8 | 11.4 | 13 | 16.1 | 10.37 | 10.37 |
| Radius at edges | 76.33 | 22.77 | 23.35 | 23.35 | 30 | 50 | 22.77 | 22.77 |
| Center arc length | 20.644 | 19.713 | 20.735 | 22.384 | 23.143 | 29.224 | 19.713 | 19.713 |
| Leg arc length | 5.68 | 6.14 | 7.13 | 7.81 | 5.93 | 4.39 | 7.64 | 9.14 |
| Curved Height Total | 8.86 | 9.76 | 10.98 | 12.16 | 9.76 | 9.76 | 11.18 | 12.64 |
| Curved Width Total | 24.81 | 22.59 | 23.98 | 25.32 | 26.71 | 30.47 | 23.53 | 24.28 |
| Ratio Curved Width to Flat Width | 0.7753125 | 0.7059375 | 0.685142857 | 0.666315789 | 0.763142857 | 0.801842105 | 0.672285714 | 0.638947368 |
| Ratio Height Width to Flat Width | 0.276875 | 0.305 | 0.313714286 | 0.32 | 0.278857143 | 0.256842105 | 0.319428571 | 0.332631579 |
| Total Energy per 1 mm Length (N * mm) @ r31 (approx 10 ft mark) | 3.7112 | 4.7072 | 4.7080 | 4.7094 | 3.6539 | 3.0517 | 4.8817 | 5.0562 |

Table 3 shows modeling data for two conventional tape measure blade designs and for six potential new tape blade designs. In Table 3, thickness is the thickness of the metal (e.g., steel) material of the tape blade, and flat width is the width of the tape blade prior to forming to a curved shape. The other blade curvature profile parameters listed in the Design Parameter column of Table 3 are labeled in FIGS. 14-16. The energy amounts shown in Table 3 are calculated for one half of the tape blade (e.g., the left or right side of the tape blade). The total energy for the entire width of the tape blade is actually double the amounts shown in Table 3.

Figure 13:
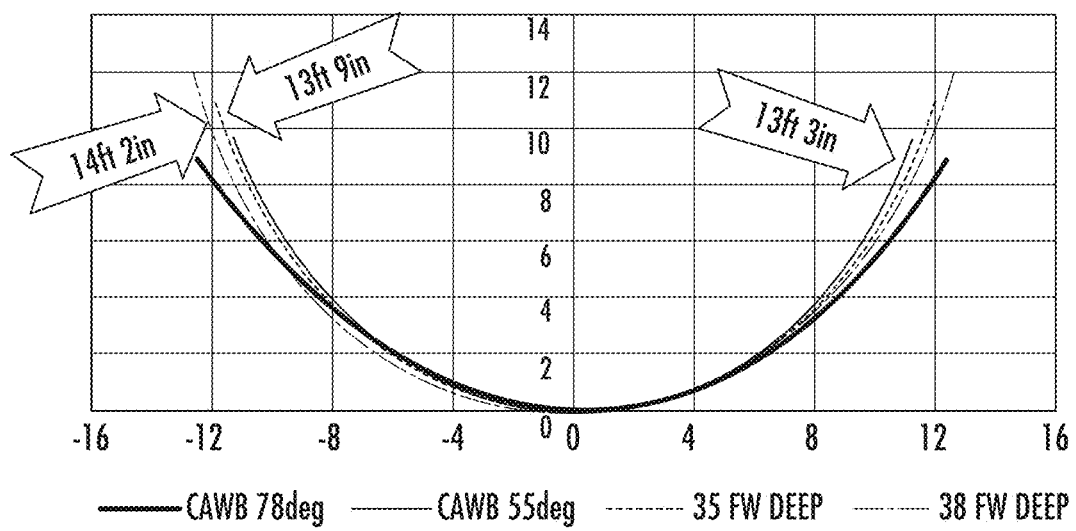
FIG. 13 is a plot of two tape blade profiles of the present disclosure plotted relative to the profiles of two prior art tape measures.
Figure 14:
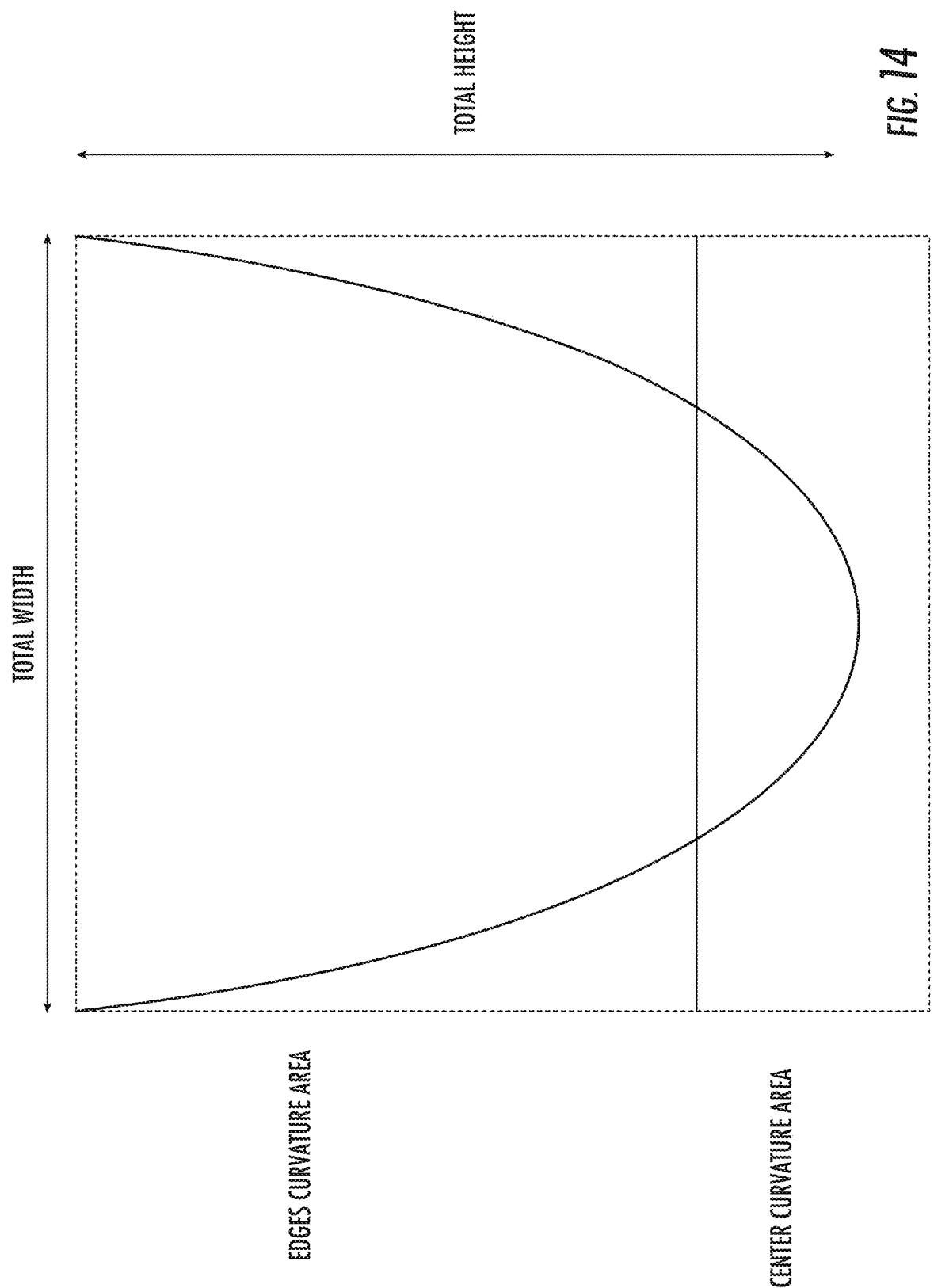
FIGS. 14-16 show an exemplary tape blade profile labeling the various dimensions listed in Table 3.

Referring to FIG. 13, the profiles of Prototype 1 and Prototype 2 are overlaid relative to Prior Art 1 and Prior Art 2 shown in Table 3. Further FIG. 13 identifies the calculated standout distance for Prior Art 2 and Prototypes 1 and 2. As shown in FIG. 13, the standout distance of both Prototypes 1 and 2 are calculated to be greater than the standout of Prior Art 2. This increase in standout has been achieved even though Prototypes 1 and 2 are less curved than Prior Art 2 which is contrary to conventional wisdom in the field of tape blade design. Further, as can be seen by comparing the values in the "Total Energy" row in Table 3, Prototypes 1 and 2 utilize approximately the same spring energy for retraction as Prior Art 2 despite having significantly greater standout.

Thus, surprisingly, Applicant determined that by designing the tape blade to have a width and profile shape as shown in Table 3 and FIG. 13, standout can be increased without requiring more torque/retraction energy to be provided by the retractions system. Thus, this allows a tape measure with a tape blade such as that of Prototype 1 and 2 to have increased standout without the need to greatly increase tape measure housing size to accommodate a larger spring (or other retraction system). Further, Applicant has further found that the greater width and/or less steep curve of the blades of Prototypes 1 and 2 also provide for increased readability of the measurement markings located on the tape blade as compared to tape blades with a lower width and/or more steeply curved blade profiles. Thus, Applicant believes that the tape blade profiles discussed herein provide a unique combination of readability, high level of standout and low retraction torque requirements not achieved with prior tape blade designs or previously understood to be achievable based on conventional understanding in the field of tape measure design.

Further, referring to Table 3, Prototypes 3 and 4 utilize less torque for retraction than either Prior Art 2 or Prototypes 1 and 2, but Applicant's modeling also indicates that Prototypes 3 and 4 will have lower standout than Prior Art 2 or Prototypes 1 and 2. Prototypes 5 and 6 utilize more torque for retraction than either Prior Art 2 or Prototypes 1 and 2, but Applicant's modeling also indicates that Prototypes 5 and 6 will have greater standout than Prior Art 2 or Prototypes 1 and 2. In at least some embodiments, Applicant has determined that some such tape blade profiles (e.g., Prototypes 5 and 6) have greater than 15 feet of standout. For at least some of the tape profiles discussed herein, Applicant believes that a cold-forming process may be a particularly suitable manufacturing technique to reliably form the profiles discussed herein.

Figure 15:
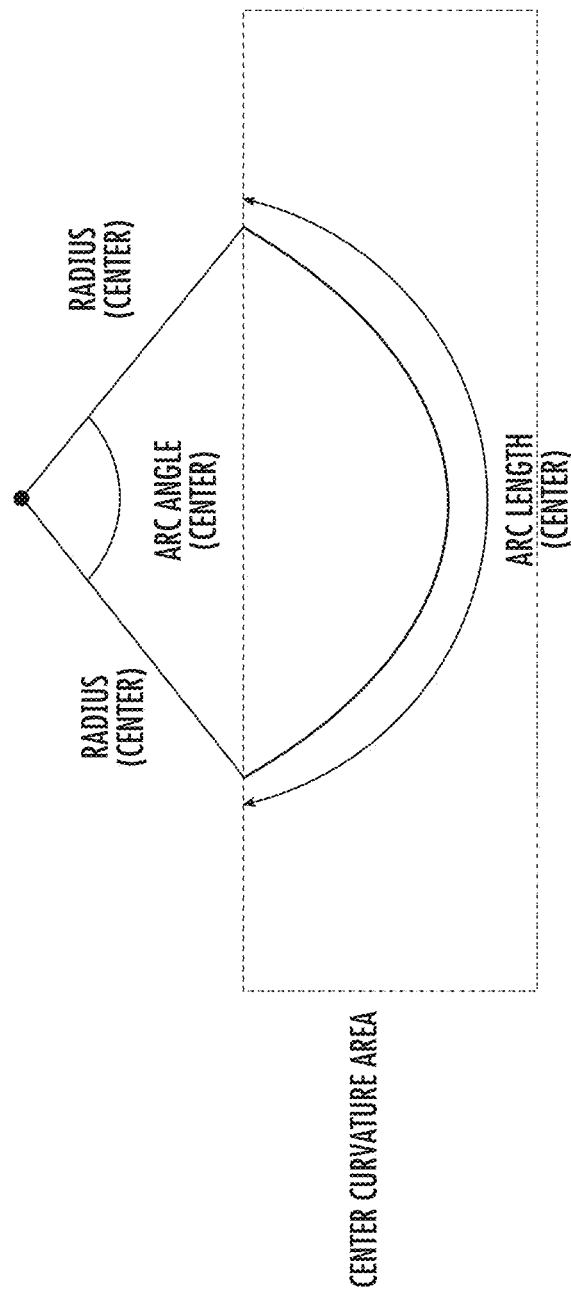
Figure 16:
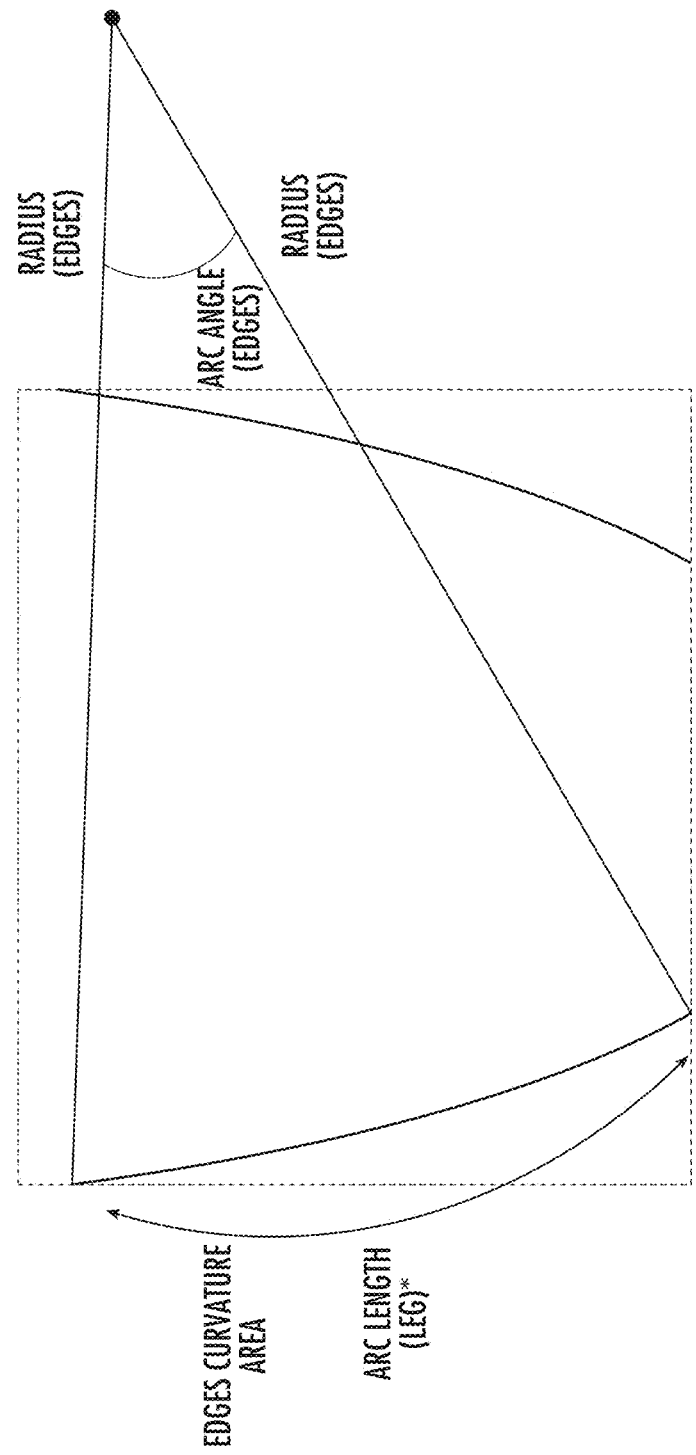

Referring to FIGS. 13-16, Applicant believes that the balance between a high level of tape blade standout, width/readability and retraction torque is achieved at least in part by utilizing a tape blade profile with a compound curvature. In particular, as shown in FIG. 15, the tape blade profile includes a first curved shape having a first radius of curvature, shown as radius (center), that defines the curved shape of the widthwise central region of the tape blade. In addition, as shown in FIG. 16, the tape blade profile includes a second curved shape having a second radius of curvature, shown as radius (edge), that defines the curved shape of the edge regions of the tape blade. As shown in FIG. 16, the edge regions are the regions of the tape blade on either widthwise side of the central region that extend to the outer lateral edges of the tape blade.

In various designs, radius (edge) is greater than radius (center). In specific embodiments, radius (edge) is at least 1.5 times radius (center) and more specifically is at least 2 times radius (center).

Figure 17:
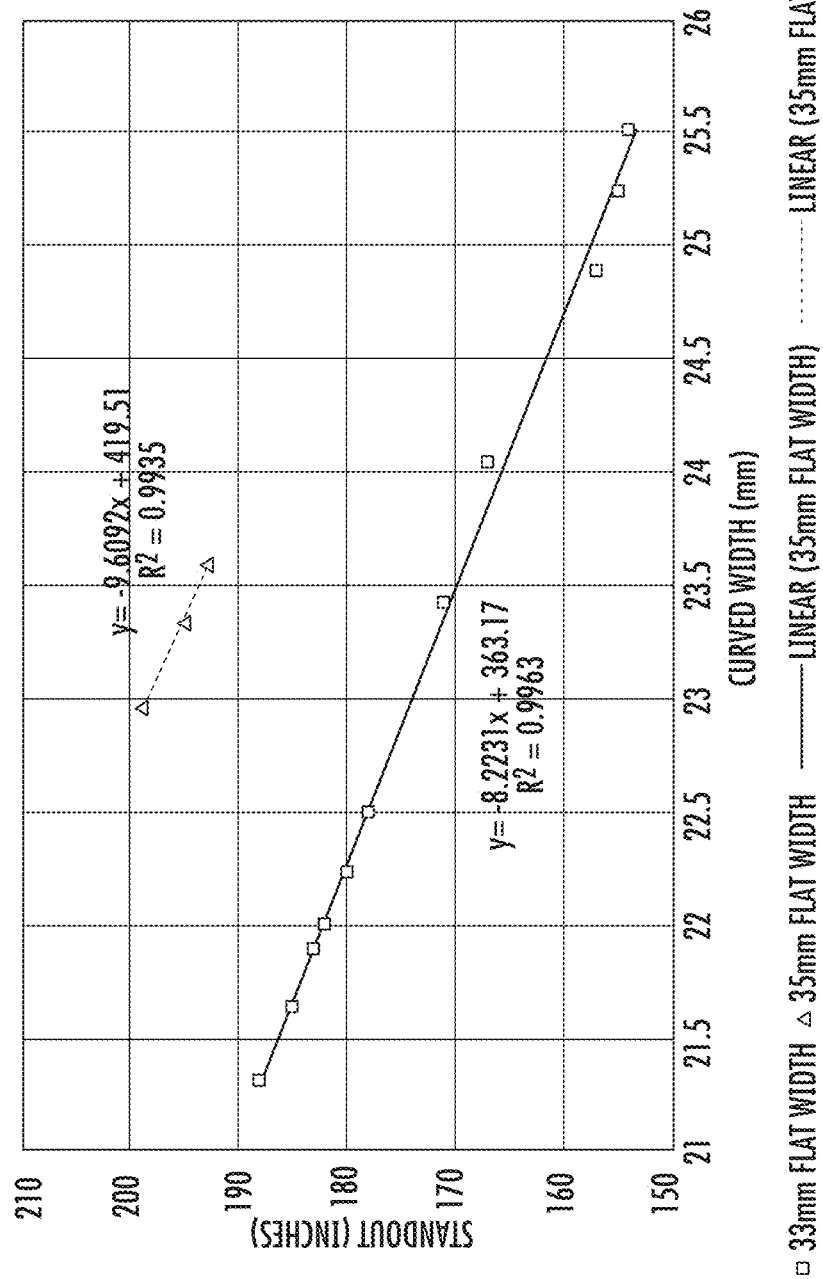
FIG. 17 shows a plot of curved width vs. standout for tape blades having a 33 mm flat width and a 35 mm flat width.
Figure 18:
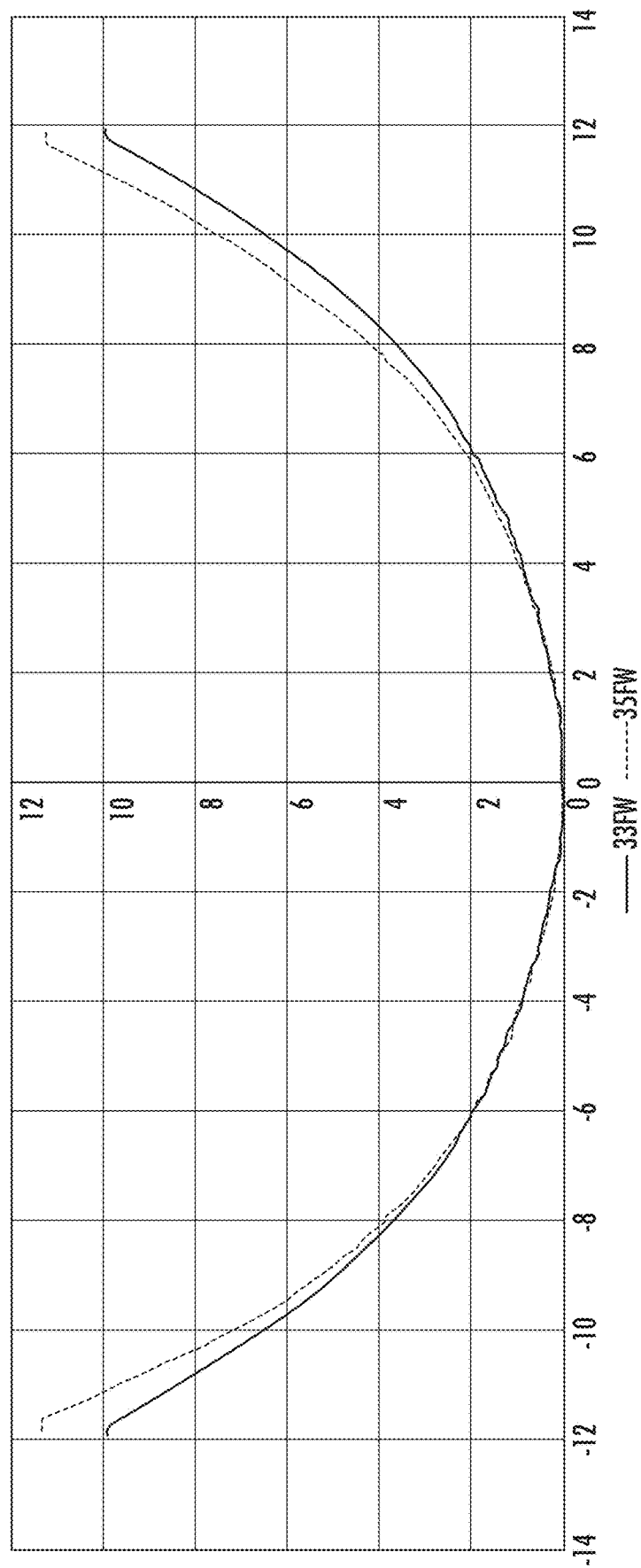
FIG. 18 is a plot of the tape blade profiles for a 33 mm flat width tape blade and a 35 mm flat width tape blade, according to an exemplary embodiment.

Referring to FIG. 17 and FIG. 18, details of various 33 mm flat width and 35 mm flat width curved tape blades are provided. FIG. 17 shows the curved width plotted against standout for both 33 mm flat width and 35 mm flat width tape blades. Table 4 below shows the flat width, curved width, curved height and ratio of curved width to curved height for a variety of 33 mm flat width and 35 mm flat width tape blades.

TABLE 4

| Flat Width (mm) | Curved Width (mm) | Curved Height (mm) | Ratio of Curved Width to Flat Width | Ratio of Curved Height to Flat Width |
| --- | --- | --- | --- | --- |
| 33 | 21.50 | 10.70 | 0.651522 | 0.324179 |
|  | 22.00 | 10.53 | 0.666684 | 0.319026 |
|  | 22.50 | 10.35 | 0.681826 | 0.313604 |
|  | 23.00 | 10.16 | 0.696969 | 0.307893 |
|  | 23.50 | 9.96 | 0.712134 | 0.301867 |
|  | 24.00 | 9.75 | 0.727247 | 0.295538 |
|  | 24.50 | 9.53 | 0.742424 | 0.288838 |
|  | 25.00 | 9.30 | 0.757569 | 0.281781 |
|  | 25.50 | 9.05 | 0.772727 | 0.274321 |
| 35 | 22.00 | 11.66 | 0.6286 | 0.353465 |
|  | 22.50 | 11.51 | 0.642814 | 0.348661 |
|  | 23.00 | 11.34 | 0.657071 | 0.323967 |
|  | 23.50 | 11.16 | 0.671544 | 0.318882 |
|  | 24.00 | 10.98 | 0.685603 | 0.313697 |
|  | 24.50 | 10.79 | 0.699919 | 0.308157 |

As shown in FIG. 17, Applicant has determined that a highly linear relationship exists between curved width and standout for 33 mm and 35 mm flat width tape blades. As shown in FIG. 17, as curved width decreases (representing a more highly curved profile) standout increases. For the 33 mm flat width tape blade, even at a curved width of 25.5 mm, standout was still greater than 150 inches, and standout increases as the curved width decreases. For the 35 mm flat width tape blade with a curved width of 23.5 mm, standout was greater than 150 inches, and standout increases as the curved width decreases. FIG. 18 shows the profile plots of exemplary profiles of a curved 33 mm flat width tape blade and a 35 mm flat width tape.

It should be understood that the figures illustrate the exemplary embodiments in detail, and it should be understood that the present application is not limited to the details or methodology set forth in the description or illustrated in the figures. It should also be understood that the terminology is for description purposes only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more component or element, and is not intended to be construed as meaning only one.

Various embodiments of the invention relate to any combination of any of the features, and any such combination of features may be claimed in this or future applications. Any of the features, elements or components of any of the exemplary embodiments discussed above may be utilized alone or in combination with any of the features, elements or components of any of the other embodiments discussed above.

What is claimed is:

1. A tape measure comprising:
   a housing;
   a reel rotatably mounted within the housing;
   an elongate blade wound around the reel, the elongate blade comprising:
      an upper surface;
      a lower surface;
      an elongate metal core having a first thickness, T1, between 0.12 mm and 0.14 mm;
      a length between 15 feet and 40 feet;
      a flat width greater than 33 mm;
      a curved profile such that the upper surface of the elongate blade defines a concave surface and the lower surface defines a convex surface;
      a curved width, wherein a ratio of the curved width to the flat width is between 0.6 and 0.8;
      wherein the curved profile is located at a location between 5 feet and 15 feet along a length of the elongate blade measured from a hook located at an end of the elongate blade; and
   a retraction system coupled to the reel, wherein the retraction system drives rewinding of the elongate blade on to the reel.

2. The tape measure of claim 1, wherein a standout distance of the elongate blade from the housing is at least 156 inches.

3. The tape measure of claim 2, wherein the standout distance of the elongate blade from the housing is greater than 160 inches.

4. The tape measure of claim 1, wherein the flat width is between 35 mm and 38 mm.

5. The tape measure of claim 1, wherein a ratio of the curved width to the flat width is less than 0.74.

6. The tape measure of claim 1, wherein a ratio of the curved width to the flat width is between 0.7 and 0.73.

7. The tape measure of claim 1, wherein the curved width is less than 23.5 mm.

8. The tape measure of claim 1, wherein a ratio of curved height to flat width is greater than 0.29.

9. The tape measure of claim 1, wherein the flat width is about 33 mm.

10. The tape measure of claim 1, wherein the flat width is about 35 mm.

11. The tape measure of claim 1, wherein T1 is less than 0.13 mm.

12. The tape measure of claim 1, wherein T1 is 0.125 mm and 0.135 mm.

13. The tape measure of claim 1, wherein the elongate blade comprises:
   an upper polymer coating coupled to an upper surface of the elongate metal core, the upper polymer coating having a second thickness, T2; and
   a lower polymer coating coupled to a lower surface of the elongate metal core, the lower polymer coating having a third thickness, T3.

14. The tape measure of claim 13, wherein $T1 \geq T2 \geq T3$.

15. The tape measure of claim 13, wherein the upper polymer coating and the lower polymer coating are both a nylon polymer material.

16. The tape measure of claim 1, wherein a standout distance of the elongate blade from the housing is at least 150 inches and droop of a 10 foot section of the elongate blade is less than 33 inches.

17. The tape measure of claim 1, wherein a ratio of a curved height of the elongate blade to the flat width is greater than 0.29.

18. The tape measure of claim 1, wherein a ratio of a curved height of the elongate blade to the flat width is greater than 0.31.

19. The tape measure of claim 1, wherein the ratio of a curved height of the elongate blade to T1 is greater than 65.

20. The tape measure of claim 1, wherein the retraction system is a spring-based retraction system comprising a spring coupled to the reel, wherein, as the elongate blade is unwound from the reel to extend from the housing, the spring stores energy and the spring releases energy driving rewinding of the elongate blade on to the reel.

* * * * *